US009015324B2

(12) United States Patent
Jackson

(10) Patent No.: US 9,015,324 B2
(45) Date of Patent: Apr. 21, 2015

(54) SYSTEM AND METHOD OF BROKERING CLOUD COMPUTING RESOURCES

(75) Inventor: David Brian Jackson, Spanish Fork, UT (US)

(73) Assignee: Adaptive Computing Enterprises, Inc., Provo, UT (US)

( * ) Notice: Subject to any disclaimer, the term of this patent is extended or adjusted under 35 U.S.C. 154(b) by 190 days.

(21) Appl. No.: 13/418,777

(22) Filed: Mar. 13, 2012

(65) Prior Publication Data

US 2012/0179824 A1  Jul. 12, 2012

Related U.S. Application Data

(63) Continuation-in-part of application No. 12/752,622, filed on Apr. 1, 2010, now Pat. No. 8,370,495, which is a continuation of application No. 11/276,856, filed on Mar. 16, 2006, now Pat. No. 7,698,430, application (Continued)

(51) Int. Cl.
*G06F 15/173* (2006.01)
*G06F 9/50* (2006.01)
(Continued)

(52) U.S. Cl.
CPC ............ *G06F 9/5077* (2013.01); *G06F 9/5027* (2013.01); *G06F 9/5061* (2013.01); *G06F 9/5072* (2013.01); *G06Q 10/06* (2013.01);
(Continued)

(58) Field of Classification Search
None
See application file for complete search history.

(56) References Cited

U.S. PATENT DOCUMENTS

| 4,215,406 A | 7/1980 | Gomola et al. |
| 4,532,893 A | 8/1985 | Day et al. |
| 4,553,202 A | 11/1985 | Trufyn |

(Continued)

FOREIGN PATENT DOCUMENTS

| CA | 2496783 | 3/2004 |
| EP | 0268435 B1 | 5/1988 |

(Continued)

OTHER PUBLICATIONS

Foster et al., "A Distributed Resource Management Architecture that Supports Advance Reservations and Co-Allocation." *Seventh International Workshop on Quality of Service (IWQoS '99)*, 1999, pp. 27-36.

(Continued)

*Primary Examiner* — Nicholas Taylor
*Assistant Examiner* — Clayton R Williams

(57) ABSTRACT

System, method, and tangible computer-readable storage media are disclosed for providing a brokering service for compute resources. The method includes, at a brokering service, polling a group of separately administered compute environments to identify resource capabilities and information, each compute resource environment including the group of managed nodes for processing workload, receiving a request for compute resources at the brokering service system, the request for compute resources being associated with a service level agreement (SLA) and based on the resource capabilities across the group of compute resource environments, selecting compute resources in one or more of the group of compute resource environments. The brokering service system receives workload associated with the request and communicates the workload to the selected resources for processing. The brokering services system can aggregate resources for multiple cloud service providers and act as an advocate for or a guarantor of the SLA associated with the workload.

24 Claims, 9 Drawing Sheets

Related U.S. Application Data

No. 13/418,777, which is a continuation of application No. 12/503,424, filed on Jul. 15, 2009, now abandoned.

(60) Provisional application No. 60/662,240, filed on Mar. 16, 2005.

(51) Int. Cl.
  *G06Q 10/06* (2012.01)
  *G06F 11/20* (2006.01)

(52) U.S. Cl.
  CPC ..... *G06F11/2038* (2013.01); *G06F 2209/5014* (2013.01); *G06F 2209/509* (2013.01)

(56) References Cited

U.S. PATENT DOCUMENTS

| | | |
|---|---|---|
| 4,677,614 A | 6/1987 | Circo |
| 4,943,932 A | 7/1990 | Lark et al. |
| 5,146,561 A | 9/1992 | Carey et al. |
| 5,299,115 A | 3/1994 | Fields et al. |
| 5,325,526 A | 6/1994 | Cameron et al. |
| 5,349,682 A | 9/1994 | Rosenberry |
| 5,377,332 A | 12/1994 | Entwistle et al. |
| 5,542,000 A | 7/1996 | Semba |
| 5,598,536 A | 1/1997 | Slaughter et al. |
| 5,600,844 A | 2/1997 | Shaw et al. |
| 5,651,006 A | 7/1997 | Fujino et al. |
| 5,675,739 A | 10/1997 | Eilert et al. |
| 5,701,451 A | 12/1997 | Rogers et al. |
| 5,737,009 A | 4/1998 | Payton |
| 5,761,433 A | 6/1998 | Billings |
| 5,774,660 A | 6/1998 | Brendel et al. |
| 5,774,668 A | 6/1998 | Choquier et al. |
| 5,826,239 A | 10/1998 | Du et al. |
| 5,854,887 A | 12/1998 | Kindell et al. |
| 5,874,789 A | 2/1999 | Su |
| 5,920,545 A | 7/1999 | Räsänen et al. |
| 5,935,293 A | 8/1999 | Detering et al. |
| 5,961,599 A | 10/1999 | Kalavade et al. |
| 5,987,611 A | 11/1999 | Freund |
| 6,006,192 A | 12/1999 | Cheng et al. |
| 6,078,953 A | 6/2000 | Vaid et al. |
| 6,097,882 A | 8/2000 | Mogul |
| 6,108,662 A | 8/2000 | Hoskins et al. |
| 6,151,598 A | 11/2000 | Shaw et al. |
| 6,161,170 A | 12/2000 | Burger et al. |
| 6,175,869 B1 | 1/2001 | Ahuja et al. |
| 6,185,601 B1 | 2/2001 | Wolff |
| 6,195,678 B1 | 2/2001 | Komuro |
| 6,201,611 B1 | 3/2001 | Carter et al. |
| 6,202,080 B1 | 3/2001 | Lu et al. |
| 6,226,677 B1 | 5/2001 | Slemmer |
| 6,247,056 B1 | 6/2001 | Chou et al. |
| 6,253,230 B1 | 6/2001 | Couland et al. |
| 6,289,382 B1 | 9/2001 | Bowman-Amuah |
| 6,314,114 B1 | 11/2001 | Coyle et al. |
| 6,317,787 B1 | 11/2001 | Boyd et al. |
| 6,327,364 B1 | 12/2001 | Shaffer et al. |
| 6,330,562 B1 | 12/2001 | Boden et al. |
| 6,330,605 B1 | 12/2001 | Christensen et al. |
| 6,338,085 B1 | 1/2002 | Ramaswamy |
| 6,338,112 B1 | 1/2002 | Wipfel et al. |
| 6,343,311 B1 | 1/2002 | Nishida et al. |
| 6,345,287 B1 | 2/2002 | Fong et al. |
| 6,351,775 B1 | 2/2002 | Yu |
| 6,363,488 B1 | 3/2002 | Ginter et al. |
| 6,366,945 B1 | 4/2002 | Fong et al. |
| 6,370,584 B1 | 4/2002 | Bestavros et al. |
| 6,374,254 B1 | 4/2002 | Cochran et al. |
| 6,385,302 B1 | 5/2002 | Antonucci et al. |
| 6,393,569 B1 | 5/2002 | Orenshteyn |
| 6,418,459 B1 | 7/2002 | Gulick |
| 6,434,568 B1 | 8/2002 | Bowman-Amuah |
| 6,438,125 B1 | 8/2002 | Brothers |
| 6,438,594 B1 | 8/2002 | Bowman-Amuah |
| 6,452,924 B1 | 9/2002 | Golden et al. |
| 6,463,454 B1 | 10/2002 | Lumelsky et al. |
| 6,466,980 B1 | 10/2002 | Lumelsky et al. |
| 6,477,580 B1 | 11/2002 | Bowman-Amuah |
| 6,487,390 B1 | 11/2002 | Virine et al. |
| 6,490,432 B1 | 12/2002 | Wegener et al. |
| 6,520,591 B1 | 2/2003 | Jun et al. |
| 6,571,215 B1 | 5/2003 | Mahapatro |
| 6,578,068 B1 | 6/2003 | Bowman-Amuah |
| 6,600,898 B1 | 7/2003 | De Bonet et al. |
| 6,601,234 B1 | 7/2003 | Bowman-Amuah |
| 6,606,660 B1 | 8/2003 | Bowman-Amuah |
| 6,622,168 B1 | 9/2003 | Datta |
| 6,626,077 B1 | 9/2003 | Gilbert |
| 6,633,544 B1 | 10/2003 | Rexford et al. |
| 6,640,238 B1 | 10/2003 | Bowman-Amuah |
| 6,651,098 B1 | 11/2003 | Carroll et al. |
| 6,724,733 B1 | 4/2004 | Schuba et al. |
| 6,735,188 B1 | 5/2004 | Becker et al. |
| 6,738,736 B1 | 5/2004 | Bond |
| 6,772,211 B2 | 8/2004 | Lu et al. |
| 6,779,016 B1 | 8/2004 | Aziz et al. |
| 6,781,990 B1 | 8/2004 | Puri et al. |
| 6,785,724 B1 | 8/2004 | Drainville et al. |
| 6,816,903 B1 | 11/2004 | Rakoshitz et al. |
| 6,816,905 B1 | 11/2004 | Sheets et al. |
| 6,857,020 B1 | 2/2005 | Chaar et al. |
| 6,862,606 B1 | 3/2005 | Major et al. |
| 6,868,097 B1 | 3/2005 | Soda et al. |
| 6,874,031 B2 | 3/2005 | Corbeil |
| 6,928,471 B2 | 8/2005 | Pabari et al. |
| 6,947,982 B1 | 9/2005 | McGann et al. |
| 6,971,098 B2 | 11/2005 | Khare et al. |
| 6,978,310 B1 | 12/2005 | Rodriguez et al. |
| 7,013,322 B2 | 3/2006 | Lahr |
| 7,020,719 B1 | 3/2006 | Grove et al. |
| 7,058,070 B2 | 6/2006 | Tran et al. |
| 7,080,378 B1 | 7/2006 | Noland et al. |
| 7,082,606 B2 | 7/2006 | Wood et al. |
| 7,085,837 B2 | 8/2006 | Kimbrel et al. |
| 7,085,893 B2 | 8/2006 | Krissell et al. |
| 7,099,933 B1 | 8/2006 | Wallace et al. |
| 7,100,192 B1 | 8/2006 | Igawa et al. |
| 7,102,996 B1 | 9/2006 | Amdahl et al. |
| 7,103,625 B1 | 9/2006 | Hipp et al. |
| 7,124,289 B1 | 10/2006 | Suorsa |
| 7,126,913 B1 | 10/2006 | Patel et al. |
| 7,143,088 B2 | 11/2006 | Green et al. |
| 7,146,233 B2 | 12/2006 | Aziz et al. |
| 7,146,416 B1 | 12/2006 | Yoo et al. |
| 7,155,478 B2 | 12/2006 | Ims et al. |
| 7,177,823 B2 | 2/2007 | Lam et al. |
| 7,185,046 B2 | 2/2007 | Ferstl et al. |
| 7,197,549 B1 | 3/2007 | Salama et al. |
| 7,197,559 B2 | 3/2007 | Goldstein et al. |
| 7,203,746 B1 | 4/2007 | Harrop |
| 7,206,819 B2 | 4/2007 | Schmidt |
| 7,216,173 B2 | 5/2007 | Clayton et al. |
| 7,225,249 B1 | 5/2007 | Barry et al. |
| 7,228,350 B2 | 6/2007 | Hong et al. |
| 7,231,445 B1 | 6/2007 | Aweya et al. |
| 7,242,501 B2 | 7/2007 | Ishimoto |
| 7,251,688 B2 | 7/2007 | Leighton et al. |
| 7,278,142 B2 | 10/2007 | Bandhole et al. |
| 7,281,045 B2 | 10/2007 | Aggarwal et al. |
| 7,293,092 B2 | 11/2007 | Sukegawa |
| 7,305,464 B2 | 12/2007 | Phillipi et al. |
| 7,313,793 B2 | 12/2007 | Traut et al. |
| 7,320,025 B1 | 1/2008 | Steinberg et al. |
| 7,324,555 B1 | 1/2008 | Chen et al. |
| 7,328,406 B2 | 2/2008 | Kalinoski et al. |
| 7,334,230 B2 | 2/2008 | Chung et al. |
| 7,350,186 B2 | 3/2008 | Coleman et al. |
| 7,353,276 B2 | 4/2008 | Bain et al. |
| 7,356,655 B2 | 4/2008 | Allen et al. |
| 7,356,770 B1 | 4/2008 | Jackson |
| 7,373,391 B2 | 5/2008 | Iinuma |

(56) References Cited

U.S. PATENT DOCUMENTS

| | | | |
|---|---|---|---|
| 7,373,524 B2 | 5/2008 | Motsinger et al. |
| 7,380,039 B2 | 5/2008 | Miloushev et al. |
| 7,386,586 B1 | 6/2008 | Headley et al. |
| 7,386,611 B2 | 6/2008 | Dias et al. |
| 7,389,310 B1 | 6/2008 | Bhagwan et al. |
| 7,392,325 B2 | 6/2008 | Grove et al. |
| 7,398,216 B2 | 7/2008 | Barnett et al. |
| 7,401,355 B2 | 7/2008 | Supnik et al. |
| 7,415,709 B2 | 8/2008 | Hipp et al. |
| 7,418,518 B2 | 8/2008 | Grove et al. |
| 7,421,402 B2 | 9/2008 | Chang et al. |
| 7,421,500 B2 | 9/2008 | Talwar et al. |
| 7,426,546 B2 | 9/2008 | Breiter et al. |
| 7,428,540 B1 | 9/2008 | Coates et al. |
| 7,437,460 B2 | 10/2008 | Chidambaran et al. |
| 7,437,730 B2 | 10/2008 | Goyal |
| 7,441,261 B2 | 10/2008 | Slater et al. |
| 7,454,467 B2 | 11/2008 | Girouard et al. |
| 7,461,134 B2 | 12/2008 | Ambrose |
| 7,464,159 B2 | 12/2008 | Di Luoffo et al. |
| 7,467,225 B2 | 12/2008 | Anerousis et al. |
| 7,483,945 B2 | 1/2009 | Blumofe |
| 7,492,720 B2 | 2/2009 | Pruthi et al. |
| 7,502,884 B1 | 3/2009 | Shah et al. |
| 7,503,045 B1 | 3/2009 | Aziz et al. |
| 7,516,221 B2 | 4/2009 | Souder et al. |
| 7,529,835 B1 | 5/2009 | Agronow et al. |
| 7,546,553 B2 | 6/2009 | Bozak et al. |
| 7,554,930 B2 | 6/2009 | Gaddis et al. |
| 7,577,834 B1* | 8/2009 | Traversat et al. | 713/156 |
| 7,577,959 B2 | 8/2009 | Nguyen et al. |
| 7,583,607 B2 | 9/2009 | Steele et al. |
| 7,590,746 B2 | 9/2009 | Slater et al. |
| 7,590,747 B2 | 9/2009 | Coates et al. |
| 7,594,011 B2 | 9/2009 | Chandra |
| 7,596,784 B2 | 9/2009 | Abrams et al. |
| 7,610,289 B2 | 10/2009 | Muret et al. |
| 7,627,691 B1 | 12/2009 | Buchsbaum et al. |
| 7,640,547 B2 | 12/2009 | Neiman et al. |
| 7,657,535 B2 | 2/2010 | Moyaux et al. |
| 7,668,809 B1 | 2/2010 | Kelly et al. |
| 7,680,933 B2 | 3/2010 | Fatula, Jr. |
| 7,685,281 B1 | 3/2010 | Saraiya et al. |
| 7,693,976 B2 | 4/2010 | Perry et al. |
| 7,693,993 B2 | 4/2010 | Sheets et al. |
| 7,694,305 B2 | 4/2010 | Karlsson et al. |
| 7,698,386 B2 | 4/2010 | Amidon et al. |
| 7,698,398 B1 | 4/2010 | Lai |
| 7,698,430 B2 | 4/2010 | Jackson |
| 7,701,948 B2 | 4/2010 | Rabie et al. |
| 7,716,334 B2 | 5/2010 | Rao et al. |
| 7,725,583 B2 | 5/2010 | Jackson |
| 7,743,147 B2 | 6/2010 | Suorsa et al. |
| 7,747,451 B2 | 6/2010 | Keohane et al. |
| RE41,440 E | 7/2010 | Briscoe et al. |
| 7,752,258 B2 | 7/2010 | Lewin et al. |
| 7,757,236 B1 | 7/2010 | Singh |
| 7,761,557 B2 | 7/2010 | Fellenstein et al. |
| 7,765,288 B2 | 7/2010 | Bainbridge et al. |
| 7,765,299 B2 | 7/2010 | Romero |
| 7,769,620 B1 | 8/2010 | Fernandez et al. |
| 7,774,331 B2 | 8/2010 | Barth et al. |
| 7,778,234 B2 | 8/2010 | Cooke et al. |
| 7,788,403 B2 | 8/2010 | Darugar et al. |
| 7,793,288 B2 | 9/2010 | Sameske |
| 7,796,619 B1 | 9/2010 | Feldmann et al. |
| 7,827,361 B1 | 11/2010 | Karlsson et al. |
| 7,844,787 B2 | 11/2010 | Ranganathan et al. |
| 7,930,397 B2 | 4/2011 | Midgley |
| 8,260,893 B1 | 9/2012 | Bandhole et al. |
| 8,261,349 B2 | 9/2012 | Peng |
| 2001/0037311 A1 | 11/2001 | McCoy et al. |
| 2001/0051929 A1 | 12/2001 | Suzuki |
| 2002/0002636 A1 | 1/2002 | Vange et al. |
| 2002/0010783 A1 | 1/2002 | Primak et al. |
| 2002/0035606 A1 | 3/2002 | Kenton |
| 2002/0049608 A1 | 4/2002 | Hartsell et al. |
| 2002/0059274 A1 | 5/2002 | Hartsell et al. |
| 2002/0062377 A1 | 5/2002 | Hillman et al. |
| 2002/0083299 A1 | 6/2002 | Van Huben et al. |
| 2002/0091786 A1 | 7/2002 | Yamaguchi et al. |
| 2002/0093915 A1 | 7/2002 | Larson |
| 2002/0107962 A1 | 8/2002 | Richter et al. |
| 2002/0116234 A1* | 8/2002 | Nagasawa | 705/5 |
| 2002/0116721 A1 | 8/2002 | Dobes et al. |
| 2002/0120741 A1 | 8/2002 | Webb et al. |
| 2002/0133821 A1 | 9/2002 | Shteyn |
| 2002/0147663 A1 | 10/2002 | Walker et al. |
| 2002/0152305 A1 | 10/2002 | Jackson et al. |
| 2002/0156891 A1 | 10/2002 | Ulrich et al. |
| 2002/0166117 A1 | 11/2002 | Abrams et al. |
| 2002/0174227 A1 | 11/2002 | Hartsell et al. |
| 2003/0004772 A1 | 1/2003 | Dutta et al. |
| 2003/0014503 A1 | 1/2003 | Legout et al. |
| 2003/0014539 A1 | 1/2003 | Reznick |
| 2003/0039246 A1 | 2/2003 | Guo et al. |
| 2003/0050989 A1 | 3/2003 | Marinescu et al. |
| 2003/0058277 A1 | 3/2003 | Bowman-Amuah |
| 2003/0069949 A1 | 4/2003 | Chan et al. |
| 2003/0097429 A1 | 5/2003 | Wu et al. |
| 2003/0097439 A1 | 5/2003 | Strayer et al. |
| 2003/0105721 A1 | 6/2003 | Ginter et al. |
| 2003/0120472 A1 | 6/2003 | Lind |
| 2003/0120701 A1 | 6/2003 | Pulsipher et al. |
| 2003/0120710 A1 | 6/2003 | Pulsipher et al. |
| 2003/0177121 A1 | 9/2003 | Moona et al. |
| 2003/0177334 A1 | 9/2003 | King et al. |
| 2003/0182429 A1 | 9/2003 | Jagels |
| 2003/0191857 A1 | 10/2003 | Terrell et al. |
| 2003/0195931 A1 | 10/2003 | Dauger |
| 2003/0210694 A1 | 11/2003 | Jayaraman et al. |
| 2003/0212738 A1 | 11/2003 | Wookey et al. |
| 2003/0231647 A1 | 12/2003 | Petrovykh |
| 2004/0003077 A1 | 1/2004 | Bantz et al. |
| 2004/0010544 A1 | 1/2004 | Slater et al. |
| 2004/0010550 A1 | 1/2004 | Gopinath |
| 2004/0015579 A1 | 1/2004 | Cooper et al. |
| 2004/0034873 A1 | 2/2004 | Zenoni |
| 2004/0039815 A1 | 2/2004 | Evans et al. |
| 2004/0054630 A1 | 3/2004 | Ginter et al. |
| 2004/0066782 A1 | 4/2004 | Nassar |
| 2004/0103078 A1 | 5/2004 | Smedberg et al. |
| 2004/0103305 A1 | 5/2004 | Ginter et al. |
| 2004/0117610 A1 | 6/2004 | Hensley |
| 2004/0128495 A1 | 7/2004 | Hensley |
| 2004/0133665 A1 | 7/2004 | Deboer et al. |
| 2004/0139202 A1 | 7/2004 | Talwar et al. |
| 2004/0143664 A1 | 7/2004 | Usa et al. |
| 2004/0179528 A1 | 9/2004 | Powers et al. |
| 2004/0181370 A1 | 9/2004 | Froehlich et al. |
| 2004/0181476 A1 | 9/2004 | Smith et al. |
| 2004/0189677 A1 | 9/2004 | Amann et al. |
| 2004/0194098 A1 | 9/2004 | Chung et al. |
| 2004/0199621 A1 | 10/2004 | Lau |
| 2004/0199646 A1 | 10/2004 | Susai et al. |
| 2004/0203670 A1 | 10/2004 | King et al. |
| 2004/0213395 A1 | 10/2004 | Ishii et al. |
| 2004/0218615 A1 | 11/2004 | Griffin et al. |
| 2004/0221038 A1 | 11/2004 | Clarke et al. |
| 2004/0236852 A1 | 11/2004 | Birkestrand et al. |
| 2004/0260746 A1 | 12/2004 | Brown et al. |
| 2004/0267897 A1 | 12/2004 | Hill et al. |
| 2005/0015621 A1 | 1/2005 | Ashley et al. |
| 2005/0021759 A1 | 1/2005 | Gupta et al. |
| 2005/0021862 A1 | 1/2005 | Schroeder et al. |
| 2005/0022188 A1 | 1/2005 | Tameshige et al. |
| 2005/0027863 A1 | 2/2005 | Talwar et al. |
| 2005/0027864 A1 | 2/2005 | Bozak et al. |
| 2005/0027865 A1 | 2/2005 | Bozak et al. |
| 2005/0038835 A1 | 2/2005 | Chidambaran et al. |
| 2005/0044226 A1* | 2/2005 | McDermott et al. | 709/226 |
| 2005/0044228 A1 | 2/2005 | Birkestrand et al. |
| 2005/0049884 A1 | 3/2005 | Hunt et al. |
| 2005/0050057 A1 | 3/2005 | Mital et al. |

(56) References Cited

U.S. PATENT DOCUMENTS

| | | |
|---|---|---|
| 2005/0054354 A1 | 3/2005 | Roman et al. |
| 2005/0055322 A1 | 3/2005 | Masters et al. |
| 2005/0055694 A1 | 3/2005 | Lee |
| 2005/0055698 A1 | 3/2005 | Sasaki et al. |
| 2005/0060608 A1 | 3/2005 | Marchand |
| 2005/0080845 A1 | 4/2005 | Gopinath |
| 2005/0080891 A1 | 4/2005 | Cauthron |
| 2005/0102396 A1 | 5/2005 | Hipp |
| 2005/0108407 A1 | 5/2005 | Johnson et al. |
| 2005/0114862 A1 | 5/2005 | Bisdikian et al. |
| 2005/0120160 A1 | 6/2005 | Plouffe et al. |
| 2005/0125213 A1 | 6/2005 | Chen et al. |
| 2005/0125537 A1 | 6/2005 | Martins et al. |
| 2005/0131898 A1 | 6/2005 | Fatula, Jr. |
| 2005/0132378 A1 | 6/2005 | Horvitz et al. |
| 2005/0144315 A1 | 6/2005 | George et al. |
| 2005/0149940 A1 | 7/2005 | Calinescu et al. |
| 2005/0160137 A1 | 7/2005 | Ishikawa et al. |
| 2005/0165925 A1 | 7/2005 | Dan et al. |
| 2005/0177600 A1 | 8/2005 | Eilam et al. |
| 2005/0188088 A1 | 8/2005 | Fellenstein et al. |
| 2005/0192771 A1 | 9/2005 | Fischer et al. |
| 2005/0193103 A1 | 9/2005 | Drabik |
| 2005/0193231 A1 | 9/2005 | Scheuren |
| 2005/0198200 A1 | 9/2005 | Subramanian et al. |
| 2005/0210470 A1 | 9/2005 | Chung et al. |
| 2005/0213507 A1 | 9/2005 | Banerjee et al. |
| 2005/0235150 A1 | 10/2005 | Kaler et al. |
| 2005/0243867 A1 | 11/2005 | Petite |
| 2005/0246705 A1 | 11/2005 | Etelson et al. |
| 2005/0249341 A1 | 11/2005 | Mahone et al. |
| 2005/0259683 A1 | 11/2005 | Bishop et al. |
| 2005/0268063 A1 | 12/2005 | Diao et al. |
| 2005/0278392 A1 | 12/2005 | Hansen et al. |
| 2005/0278760 A1 | 12/2005 | Dewar et al. |
| 2005/0283822 A1 | 12/2005 | Appleby et al. |
| 2005/0288961 A1 | 12/2005 | Tabrizi |
| 2005/0289540 A1 | 12/2005 | Nguyen et al. |
| 2006/0015773 A1 | 1/2006 | Singh et al. |
| 2006/0028991 A1 | 2/2006 | Tan et al. |
| 2006/0031379 A1 | 2/2006 | Kasriel et al. |
| 2006/0031547 A1 | 2/2006 | Tsui et al. |
| 2006/0031813 A1 | 2/2006 | Bishop et al. |
| 2006/0039246 A1 | 2/2006 | King et al. |
| 2006/0041444 A1 | 2/2006 | Flores et al. |
| 2006/0048157 A1 | 3/2006 | Dawson et al. |
| 2006/0059253 A1 | 3/2006 | Goodman et al. |
| 2006/0069671 A1 | 3/2006 | Conley et al. |
| 2006/0069926 A1 | 3/2006 | Ginter et al. |
| 2006/0089894 A1 | 4/2006 | Balk et al. |
| 2006/0090136 A1 | 4/2006 | Miller et al. |
| 2006/0095917 A1 | 5/2006 | Black-Ziegelbein et al. |
| 2006/0117317 A1* | 6/2006 | Crawford et al. ............ 718/104 |
| 2006/0136235 A1 | 6/2006 | Keohane et al. |
| 2006/0143350 A1 | 6/2006 | Miloushev et al. |
| 2006/0149695 A1 | 7/2006 | Bossman et al. |
| 2006/0155740 A1 | 7/2006 | Chen et al. |
| 2006/0159088 A1 | 7/2006 | Aghvami et al. |
| 2006/0168107 A1 | 7/2006 | Balan et al. |
| 2006/0168224 A1 | 7/2006 | Midgley |
| 2006/0173730 A1 | 8/2006 | Birkestrand |
| 2006/0189349 A1 | 8/2006 | Montulli et al. |
| 2006/0190775 A1 | 8/2006 | Aggarwal et al. |
| 2006/0190975 A1 | 8/2006 | Gonzalez |
| 2006/0212332 A1 | 9/2006 | Jackson |
| 2006/0212333 A1 | 9/2006 | Jackson |
| 2006/0212334 A1 | 9/2006 | Jackson |
| 2006/0212740 A1 | 9/2006 | Jackson |
| 2006/0224741 A1 | 10/2006 | Jackson |
| 2006/0227810 A1 | 10/2006 | Childress et al. |
| 2006/0251419 A1 | 11/2006 | Zadikian et al. |
| 2006/0294238 A1 | 12/2006 | Naik et al. |
| 2007/0050777 A1 | 3/2007 | Hutchinson et al. |
| 2007/0067366 A1 | 3/2007 | Landis |
| 2007/0083899 A1 | 4/2007 | Compton et al. |
| 2007/0088822 A1 | 4/2007 | Coile et al. |
| 2007/0094691 A1 | 4/2007 | Gazdzinski |
| 2007/0124344 A1 | 5/2007 | Rajakannimariyan et al. |
| 2007/0143824 A1 | 6/2007 | Shahbazi |
| 2007/0155406 A1 | 7/2007 | Dowling et al. |
| 2007/0180380 A1 | 8/2007 | Khavari et al. |
| 2007/0253017 A1* | 11/2007 | Czyszczewski et al. ...... 358/1.15 |
| 2007/0264986 A1 | 11/2007 | Warrillow et al. |
| 2007/0266136 A1 | 11/2007 | Esfahany et al. |
| 2007/0271375 A1 | 11/2007 | Hwang |
| 2008/0082663 A1 | 4/2008 | Mouli et al. |
| 2008/0104231 A1 | 5/2008 | Dey et al. |
| 2008/0183865 A1 | 7/2008 | Appleby et al. |
| 2008/0215730 A1 | 9/2008 | Sundaram et al. |
| 2008/0255953 A1 | 10/2008 | Chang et al. |
| 2008/0279167 A1 | 11/2008 | Cardei et al. |
| 2009/0070771 A1 | 3/2009 | Yuyitung et al. |
| 2009/0100133 A1 | 4/2009 | Giulio et al. |
| 2009/0103501 A1 | 4/2009 | Farrag et al. |
| 2009/0105059 A1 | 4/2009 | Dorry et al. |
| 2009/0113056 A1 | 4/2009 | Tameshige et al. |
| 2009/0138594 A1 | 5/2009 | Fellenstein et al. |
| 2009/0178132 A1 | 7/2009 | Hudis et al. |
| 2009/0210356 A1 | 8/2009 | Abrams et al. |
| 2009/0210495 A1 | 8/2009 | Wolfson et al. |
| 2009/0216910 A1 | 8/2009 | Duchesneau |
| 2009/0217329 A1 | 8/2009 | Riedl et al. |
| 2009/0225360 A1 | 9/2009 | Shirai |
| 2009/0234962 A1 | 9/2009 | Strong et al. |
| 2009/0234974 A1 | 9/2009 | Arndt et al. |
| 2009/0235104 A1 | 9/2009 | Fung |
| 2009/0238349 A1 | 9/2009 | Pezzutti |
| 2009/0292824 A1 | 11/2009 | Marashi et al. |
| 2009/0300608 A1 | 12/2009 | Ferris et al. |
| 2009/0327079 A1 | 12/2009 | Parker et al. |
| 2009/0327489 A1 | 12/2009 | Swildens et al. |
| 2010/0036945 A1 | 2/2010 | Allibhoy et al. |
| 2010/0049931 A1* | 2/2010 | Jacobson et al. .............. 711/162 |
| 2010/0088205 A1* | 4/2010 | Robertson ...................... 705/34 |
| 2010/0091676 A1 | 4/2010 | Moran et al. |
| 2010/0103837 A1 | 4/2010 | Jungck et al. |
| 2010/0114531 A1* | 5/2010 | Korn et al. ..................... 702/186 |
| 2010/0122261 A1 | 5/2010 | Karo |
| 2010/0131324 A1 | 5/2010 | Ferris |
| 2010/0131624 A1* | 5/2010 | Ferris ............................. 709/221 |
| 2010/0153546 A1 | 6/2010 | Clubb et al. |
| 2010/0169477 A1 | 7/2010 | Stienhans et al. |
| 2010/0217801 A1 | 8/2010 | Leighton et al. |
| 2010/0235234 A1 | 9/2010 | Shuster |
| 2010/0281166 A1* | 11/2010 | Buyya et al. .................. 709/226 |
| 2010/0318665 A1 | 12/2010 | Demmer et al. |
| 2010/0332262 A1* | 12/2010 | Horvitz et al. ................. 705/4 |
| 2011/0145393 A1* | 6/2011 | Ben-Zvi et al. ............... 709/224 |
| 2011/0314465 A1* | 12/2011 | Smith et al. ................... 718/1 |
| 2012/0159116 A1 | 6/2012 | Lim et al. |
| 2012/0185334 A1 | 7/2012 | Sarkar et al. |
| 2012/0218901 A1 | 8/2012 | Jungck et al. |
| 2013/0066940 A1* | 3/2013 | Shao ............................. 709/201 |

FOREIGN PATENT DOCUMENTS

| | | |
|---|---|---|
| EP | 1331564 A1 | 7/2003 |
| EP | 1365545 A1 | 11/2003 |
| EP | 1492309 A3 | 12/2004 |
| EP | 1865684 A1 | 12/2007 |
| GB | 2391744 A | 2/2004 |
| KR | 2004/0107934 | 12/2004 |
| WO | WO 98/11702 | 3/1998 |
| WO | WO 99/57660 | 11/1999 |
| WO | WO 00/14938 | 3/2000 |
| WO | WO 00/60825 | 10/2000 |
| WO | WO 01/09791 | 2/2001 |
| WO | WO 01/14987 | 3/2001 |
| WO | WO 01/15397 | 3/2001 |
| WO | WO 01/39470 | 5/2001 |
| WO | WO 03/046751 | 6/2003 |
| WO | WO 2004/070547 | 8/2004 |
| WO | WO 2004/092884 | 10/2004 |

(56) References Cited

FOREIGN PATENT DOCUMENTS

| WO | WO 2005/017783 | 2/2005 |
|---|---|---|
| WO | WO 2006/036277 | 4/2006 |
| WO | WO 2006/112981 | 10/2006 |

OTHER PUBLICATIONS

Gupta, A., Kleinberg, J., Kumar, A., Rastogi, R. & Yener, B. "Provisioning a virtual private network: a network design problem for multicommodity flow," Proceedings of the thirty-third annual ACM symposium on Theory of computing [online], Jul. 2001, pp. 389-398, abstract [retrieved on Jun. 14, 2007].Retrieved from the Internet<URL:http://portal.acm.org/citation.cfm?id=380830 &dl=ACM&coll=GUIDE>.
Xu, Zhiwei et al., "Cluster and Grid Superservers: The Dawning Experiences in China", Institute of Computing Technology, Chinese Academy of Sciences, P.O. Box 2704, Beijing 100080, China. Proceedings of the 2001 IEEE International Conference on Cluster Computing. IEEE 2002.
Zeng, Daniel et al., "Efficient Web Content Delivery Using Proxy Caching Techniques", IEEE Transactions on Systems, Man, and Cybernetics—Part C: Applications and Reviews, vol. 34, No. 3, pp. 270-280, Aug. 2004.
Zhang, Qian et al., "Resource Allocation for Multimedia Streaming Over the Internet", IEEE Transactions on Multimedia, vol. 3, No. 3, pp. 339-355, Sep. 2001.
Chandra, Abhishek et al., "Quantifying the Benefits of Resource Multiplexing in On-Demand Data Centers", Department of Computer Science, University of Massachusetts Amherst, 2003.
J. Rolia, S. Singhal, and R. Friedrich, "Adaptive Internet data centers", In *Proceedings of the International Conference on Advances in Infrastructure for Electronic Business, Science, and Education on the Internet (SSGRR '00)*, Jul. 2000.
Jeffrey S. Chase, David E. Irwin, Laura E. Grit, Justin D. Moore, Sara E. Sprenkle, "Dynamic Virtual Clusters in a Grid Site Manager", In *Proceedings of the 12th IEEE International Symposium on High Performance Distributed Computing (HPDC'03)*, p. 90, Jun. 2003.
R. Doyle, J. Chase, O. Asad, W. Jin, and A. Vandat, "Model-Based Resource Provisioning in a Web Service Utility", In *Proceedings of the Fourth USENIX Symposium on Internet Technologies and Systems (USITS)*, Mar. 2003.
L. Bradford, S. Milliner, and M. Dumas, "Experience Using a Coordination-based Architecture for Adaptive Web Content Provision", In *Coordination*, pp. 140-156. Springer, 2005.
S. Ranjan, J. Rolia, H. Fu, and E. Knightly, "QoS-driven Server Migration for Internet Data Centers", In *Proceedings of the Tenth International Workshop on Quality of Service (IWQoS 2002)*, May 2002.
Russell, Clark, et al., "Providing Scalable Web Service Using Multicast Delivery", College of Computing, Georgia Institute of Technology, Atlanta, GA 30332-0280, 1995.
Reed, Daniel et al., "The Next Frontier: Interactive and Closed Loop Performance Steering", Department of Computer Science, University of Illinois, Urbana, Illinois 61801, International Conference on Parallel Processing Workshop, 1996.
Bian, Qiyong, et al., "Dynamic Flow Switching, A New Communication Service for ATM Networks", 1997.
Feldmann, Anja, et al., "Reducing Overhead in Flow-Switched Networks: An Empirical Study of Web Traffic", AT&T Labs-Research, Florham Park, NJ, 1998.
Feldmann, Anja, et al., "Efficient Policies for Carrying Web Traffic Over Flow-Switched Networks", IEEE/ACM Transactions on Networking, vol. 6, No. 6, Dec. 1998.
Feng, Chen, et al., "Replicated Servers Allocation for Multiple Information Sources in a Distributed Environment", Department of Computer Science, Hong Kong University of Science and Technology, Clear Water Bay, Kowloon, Hong Kong, Sep. 2000.

Wang, Z., et al., "Resource Allocation for Elastic Traffic: Architecture and Mechanisms", Bell Laboratories, Lucent Technologies, Network Operations and Management Symposium, 2000. 2000 IEEE/IFIP, pp. 157-170. Apr. 2000.
Fan, Li, et al., "Summary Cache: A Scalable Wide-Area Web Cache Sharing Protocol", IEEE/ACM Transactions on networking, vol. 8, No. 3, Jun. 2000.
Yang, Chu-Sing, et al., "Building an Adaptable, Fault Tolerant, and Highly Manageable Web Server on Clusters of Non-dedicated Workstations", Department of Computer Science and Engineering, National Sun Yat-Sen University, Kaohsiung, Taiwan, R.O.C.. 2000.
Appleby, K., et. al., "Oceano-SLA Based Management of a Computing Utility", IBM T.J. Watson Research Center, P.O.Box 704, Yorktown Heights, New York 10598, USA. Proc. 7th IFIP/IEEE Int'l Symp. Integrated Network Management, IEEE Press 2001.
Abdelzaher, Tarek, et al., "Performance Guarantees for Web Server End-Systems: A Control-Theoretical Approach", IEEE Transactions on Parallel and Distributed Systems, vol. 13, No. 1, Jan. 2002.
Garg, Rahul, et al., "A SLA Framework for QoS Provisioning and Dynamic Capacity Allocation", 2002.
Xu, Jun, et al., "Sustaining Availability of Web Services under Distributed Denial of Service Attacks", IEEE Transactions on Computers, vol. 52, No. 2, pp. 195-208, Feb. 2003.
McCann, Julie, et al., "Patia: Adaptive Distributed Webserver (A Position Paper)", Department of Computing, Imperial College London, SW1 2BZ, UK. 2003.
Urgaonkar, Bhuvan, et al., "Sharc: Managing CPU and Network Bandwidth in Shared Clusters", IEEE Transactions on Parallel and Distributed Systems, vol. 15, No. 1, pp. 2-17, Jan. 2004.
Liao, Raymond, et al., "Dynamic Core Provisioning for Quantitative Differentiated Services", IEEE/ACM Transactions on Networking, vol. 12, No. 3, pp. 429-442, Jun. 2004.
L. Amini, A. Shaikh, and H. Schulzrinne, "Effective Peering for Multi-provider Content Delivery Services", In *Proceedings of 23rd Annual IEEE Conference on Computer Communications (INFOCOM'04)*, pp. 850-861, 2004.
Soldatos, John, et al., "On the Building Blocks of Quality of Service in Heterogeneous IP Networks", IEEE Communications Surveys, The Electronic Magazine of Original Peer-Reviewed Survey Articles, vol. 7, No. 1. First Quarter 2005.
M. Devarakonda, V.K. Naik, N. Rajamanim, "Policy-based multi-datacenter resource management", In *6th IEEE International Workshop on Policies for Distributed Systems and Networks*, pp. 247-250, Jun. 2005.
Rashid, Mohammad, et al., "An Analytical Approach to Providing Controllable Differentiated Quality of Service in Web Servers", IEEE Transactions on Parallel and Distributed Systems, vol. 16, No. 11, pp. 1022-1033, Nov. 2005.
Braumandl, R. et al., "ObjectGlobe: Ubiquitous query processing on the Internet", Universität Passau, Lehrstuhl für Informatik, 94030 Passau, Germany. Technische Universität München, Institut für Informatik, 81667 München, Germany. Edited by F. Casati, M.-C. Shan, D. Georgakopoulos. Received: Oct. 30, 2000 / Accepted: Mar. 14, 2001.Published online: Jun. 7, 2001—_c Springer-Verlag 2001.
K. Shen, L. Chu, and T. Yang, "Supporting Cluster-based Network Services on Functionally Symmetric Software Architecture", In *Proceedings of the ACM/IEEE SC2004 Conference*, Nov. 2004.
S. Benker, I. Brandic, G. Engelbrecht, R. Schmidt, "VGE—A Service-Oriented Grid Environment for On-Demand Supercomputing", In *Proceedings of the Fifth IEEE/ACM International Workshop on Grid Computing (GRID'04)*, Pittsburgh, PA, USA, Nov. 2004.
Y. Amir and D. Shaw, "WALRUS—A Low Latency, High Throughput Web Service Using Internet-wide Replication", In *Proceedings of the 19th International Conference on Distributed Computing Systems Workshop*, 1998.
K. Azuma, T. Okamoto, G. Hasegawa, and M. Murata, "Design, Implementation and Evaluation of Resource Management System for Internet Servers", IOS Press, *Journal of High Speed Networks*, vol. 14 Issue 4, pp. 301-316, Oct. 2005.
Baentsch, Michael et al., "World Wide Web Caching: The Application-Level View of the Internet", Communications Magazine, IEEE, vol. 35, Issue 6, pp. 170-178, Jun. 1997.

(56) References Cited

OTHER PUBLICATIONS

Banga, Gaurav et al., "Resource Containers: A New Facility for Resource Management in Server Systems", Rice University, originally published in the Proceedings of the 3$^{rd}$ Symposium on Operating Systems Design and Implementation, New Orleans, Louisiana, Feb. 1999.

Belloum, A. et al., "A Scalable Web Server Architecture", World Wide Web: Internet and Web Information Systems, 5, 5-23, 2002 Kluwer Academic Publishers. Manufactured in The Netherlands. 2000.

Cardellini, Valeria et al., "Geographic Load Balancing for Scalable Distributed Web Systems", Proceedings of the 8th International Symposium on Modeling, Analysis and Simulation of Computer and Telecommunication Systems, pp. 20-27. 2000.

E. Casalicchio and S. Tucci, "Static and Dynamic Scheduling Algorithms for Scalable Web Server Farm", In *Proceedings of the IEEE 9$^{th}$ Euromicro Workshop on Parallel and Distributed Processing*, pp. 369-376, 2001.

J. Chase, D. Irwin, L. Grit, J. Moore and S. Sprenkle, "Dynamic Virtual Clusters in a Grid Site Manager", In *Proceedings of the 12$^{th}$ IEEE International Symposium on High Performance Distributed Computing*, pp. 90-100, 2003.

Chawla, Hamesh et al., "HydraNet: Network Support for Scaling of Large-Scale Services", Proceedings of 7th International Conference on *Computer Communications and Networks, 1998*. Oct. 1998.

Chen, Xiangping et al., "Performance Evaluation of Service Differentiating Internet Servers", IEEE Transactions on Computers, vol. 51, No. 11, pp. 1368-1375, Nov. 2002.

Chu, Wesley et al., "Taks Allocation and Precedence Relations for Distributed Real-Time Systems", IEEE Transactions on Computers, vol. C-36, No. 6, pp. 667-679. Jun. 1987.

M. Clarke and G. Coulson, "An Architecture for Dynamically Extensible Operating Systems", In *Proceedings of the 4th International Conference on Configurable Distributed Systems (ICCDS '98)*, Annapolis, MD, May 1998.

M. Colajanni, P. Yu, V. Cardellini, M. Papazoglou, M. Takizawa, B. Cramer and S. Chanson, "Dynamic Load Balancing in Geographically Distributed Heterogeneous Web Servers", In *Proceedings of the 18$^{th}$ International Conference on Distributed Computing Systems*, pp. 295-302, May 1998.

Colajanni, Michele et al., "Analysis of Task Assignment Policies in Scalable Distributed Web-server Systems", IEEE Transactions on Parallel and Distributed Systes, vol. 9, No. 6, Jun. 1998.

Conti, Marco, et al., "Client-side content delivery policies in replicated web services: parallel access versus single server approach", Istituto di Informatica e Telematica (IIT), Italian National Research Council (CNR), Via G. Moruzzi, I. 56124 Pisa, Italy, Performance Evaluation 59 (2005) 137-157, Available online Sep. 11, 2004.

Dilley, John, et al., "Globally Distributed Content Delivery", IEEE Internet Computing, 1089-7801/02/$17.00 ©2002 IEEE, pp. 50-58, Sep.-Oct. 2002.

Ercetin, Ozgur et al., "Market-Based Resource Allocation for Content Delivery in the Internet", IEEE Transactions on Computers, vol. 52, No. 12, pp. 1573-1585, Dec. 2003.

Fong, L.L. et al., "Dynamic Resource Management in an eUtility", IBM T. J. Watson Research Center, 0-7803-7382-0/02/$17.00 © 2002 IEEE.

Foster, Ian et al., "The Anatomy of the Grid—Enabling Scalable Virtual Organizations", To appear: Intl J. Supercomputer Applications, 2001.

Gayek, P., et al., "A Web Content Serving Utility", IBM Systems Journal, vol. 43, No. 1, pp. 43-63. 2004.

Genova, Zornitza et al., "Challenges in URL Switching for Implementing Globally Distributed Web Sites", Department of Computer Science and Engineering, University of South Florida, Tampa, Florida 33620. 0-7695-0771-9/00 $10.00-IEEE. 2000.

J. Guo, L. Bhuyan, R. Kumar and S. Basu, "QoS Aware Job Scheduling in a Cluster-Based Web Server for Multimedia Applications", In *Proceedings of the 19$^{th}$ IEEE International Parallel and Distributed Processing Symposium (IPDPS'05)*, Apr. 2005.

Hu, E.C. et al., "Adaptive Fast Path Architecture", Copyright 2001 by International Business Machines Corporation, pp. 191-206, IBM J. Res. & Dev. vol. 45 No. 2 Mar. 2001.

C. Huang, S. Sebastine and T. Abdelzaher, "An Architecture for Real-Time Active Content Distribution", In *Proceedings of the 16$^{th}$ Euromicro Conference on Real-Time Systems (ECRTS 04)*, pp. 271-280, 2004.

Jann, Joefon et al., "Web Applications and Dynamic Reconfiguration in UNIX Servers", IBM, Thomos J. Watson Research Center, Yorktown Heights, New York 10598, 0-7803-7756-7/03/$17.00. 2003 IEEE. pp. 186-194.

Jiang, Xuxian et al., "Soda: a Service-On-Demand Architecture for Application Service Hosting Utility Platforms", Proceedings of the 12th IEEE International Symposium on High Performance Distributed Computing (HPDC'03) 1082-8907/03 $17.00 © 2003 IEEE.

Kant, Krishna et al., "Server Capacity Planning for Web Traffic Workload", IEEE Transactions on Knowledge and Data Engineering, vol. 11, No. 5, Sep./Oct. 1999, pp. 731-474.

R. Kapitza, F. J. Hauck, and H. P. Reiser, "Decentralized, Adaptive Services: The AspectIX Approach for a Flexible and Secure Grid Environment", In *Proceedings of the Grid Services Engineering and Management Conferences* (GSEM, Erfurt, Germany, Nov. 2004), pp. 107-118, LNCS 3270, Springer, 2004.

Koulopoulos, D. et al., "Pleiades: An Internet-based parallel/distributed system", Software-Practice and Experience 2002; 32:1035-1049 (DOI: 10.1002/spe.468).

I. Kuz, P. Verkaik, M. van Steen and H. J. Sips, "A Distributed-Object Infrastructure for Corporate Websites", In *Proceedings IEEE Distributed Objects and Applications (DOA'00)*, Antwerp, pp. 165-176, 2000.

Lu, Chenyang et al., "A Feedback Control Approach for Guaranteeing Relative Delays in Web Servers", Department of Computer Science, University of Virginia, Charlottesville, VA 22903, 0-7695-1134-1/01 $10.00. 2001 IEEE.

Mahon, Rob et al., "Cooperative Design in Grid Services", The 8th International Conference on Computer Supported Cooperative Work in Design Proceedings. pp. 406-412. IEEE 2003.

Montez, Carlos et al., "Implementing Quality of Service in Web Servers", LCMI—Depto de Automacao e Sistemas—Univ. Fed. de Santa Catarina, Caixa Postal 476-88040-900—Florianopolis—SC—Brasil, 1060-9857/02 $17.00. 2002 IEEE.

I. Haddad and E. Paquin, "Mosix: A Cluster Load-Balancing Solution for Linux", In *Linux Journal*, vol. 2001 Issue 85es, Article No. 6, May 2001.

V. K. Naik, S. Sivasubramanian and S. Krishnan, "Adaptive Resource Sharing in a Web Services Environment", In *Proceedings of the 5$^{th}$ ACM/IFIP/USENIX International Conference on Middleware (Middleware '04)*, pp. 311-330, Springer-Verlag New York, Inc. New York, NY, USA, 2004.

S. Nakrani and C. Tovey, "On Honey Bees and Dynamic Server Allocation in Internet Hosting Centers", Adaptive Behavior, vol. 12, No. 3-4, pp. 223-240, Dec. 2004.

Abdelwahed, Sherif et al., "A Control-Based Framework for Self-Managing Distributed Computing Systems", WOSS'04 Oct. 31-Nov. 1, 2004 Newport Beach, CA, USA. Copyright 2004 ACM 1-58113-989-6/04/0010.

Aweya, James et al., "An adaptive load balancing scheme for web servers", International Journal of Network Management 2002; 12: 3-39 (DOI: 10.1002/nem.421), Copyright 2002 John Wiley & Sons, Ltd.

L. Chen and G. Agrawal, "Resource Allocation in a Middleware for Streaming Data", In *Proceedings of the 2$^{nd}$ Workshop on Middleware for Grid Computing (MGC '04)*, pp. 5-10, Toronto, Canada, Oct. 2004.

Workshop on Performance and Architecture of Web Servers (PAWS-2000) Jun. 17-18, 2000, Santa Clara, CA (Held in conjunction with SIGMETRICS-2000).

Hadjiefthymiades, Stathes et al., "Using Proxy Cache Relocation to Accelerate Web Browsing in Wireless/Mobile Communications", University of Athens, Dept. of Informatics and Telecommunications, Panepistimioupolis, Ilisia, Athens, 15784, Greece. *WWW10*, May 1-5, 2001, Hong Kong.

(56) References Cited

OTHER PUBLICATIONS

Fox, Armando et al., "Cluster-Based Scalable Network Services", University of California at Berkeley, SOSP-16 10/97 Saint-Malo, France, ACM 1997.
Chen, Thomas, "Increasing the Observability of Internet Behavior", Communications of the ACM, vol. 44, No. 1, pp. 93-98, Jan. 2001.
Shaikh, Anees et al., "Implementation of a Service Platform for Online Games", Network Software and Services, IBM T.J. Watson Research Center, Hawthorne, NY 10532, SIGCOMM'04 Workshops, Aug. 30 & Sep. 3, 2004, Portland, Oregon, USA. Copyright 2004 ACM.
Chellappa, Ramnath et al., "Managing Computing Resources in Active Intranets", International Journal of Network Management, 2002, 12:117-128 (DOI:10.1002/nem.427).
Lowell, David et al., "Devirtualizable Virtual Machines Enabling General, Single-Node, Online Maintenance", ASPLOS'04, Oct. 9-13, 2004, Boston, Massachusetts, USA. pp. 211-223, Copyright 2004 ACM.
K. Shen, H. Tang, T. Yang, and L. Chu, "Integrated Resource Management for Cluster-based Internet Services", In *Proceedings of the 5th Symposium on Operating Systems Design and Implementation (OSDI '02)*, pp. 225-238, Dec. 2002.
Cardellini, Valeria et al., "The State of the Art in Locally Distributed Web-Server Systems", ACM Computing Surveys, vol. 34, No. 2, Jun. 2002, pp. 263-311.
Grajcar, Martin, "Genetic List Scheduling Algorithm for Scheduling and Allocation on a Loosely Coupled Heterogeneous Multiprocessor System", Proceedings of the 36$^{th}$ annual ACM/IEEE Design Automation Conference, New Orleans, Louisiana, pp. 280-285. 1999.
Chandra, Abhishek et al., "Dynamic Resource Allocation for Shared Data Centers Using Online Measurements" Proceedings of the 11th international conference on Quality of service, Berkeley, CA, USA pp. 381-398. 2003.
Grimm, Robert et al., "System Support for Pervasive Applications", ACM Transactions on Computer Systems, vol. 22, No. 4, Nov. 2004, pp. 421-486.
Bent, Leeann et al., "Characterization of a Large Web Site Population with Implications for Content Delivery", *WWW 2004*, May 17-22, 2004, New York, New York, USA ACM 1-58113-844-X/04/0005, pp. 522-533.
Pacifici, Giovanni et al., "Performance Management for Cluster Based Web Services", IBM TJ Watson Research Center, May 13, 2003.
Conti, Marco et al., "Quality of Service Issues in Internet Web Services", IEEE Transactions on Computers, vol. 51, No. 6, pp. 593-594, Jun. 2002.
Raunak, Mohammad et al., "Implications of Proxy Caching for Provisioning Networks and Servers", IEEE Journal on Selected Areas in Communications, vol. 20, No. 7, pp. 1276-1289, Sep. 2002.
Reumann, John et al., "Virtual Services: A New Abstraction for Server Consolidation", Proceedings of 2000 USENIX Annual Technical Conference, San Diego, California, Jun. 18-23, 2000.
J. Rolia, X. Zhu, and M. Arlitt, "Resource Access Management for a Utility Hosting Enterprise Applications", In *Proceedings of the 8th IFIP/IEEE International Symposium on Integrated Network Management (IM)*, pp. 549-562, Colorado Springs, Colorado, USA, Mar. 2003.
Ryu, Kyung Dong et al., "Resource Policing to Support Fine-Grain Cycle Stealing in Networks of Workstations", IEEE Transactions on Parallel and Distributed Systems, vol. 15, No. 10, pp. 878-892, Oct. 2004.
Sacks, Lionel et al., "Active Robust Resource Management in Cluster Computing Using Policies", Journal of Network and Systems Management, vol. 11, No. 3, pp. 329-350, Sep. 2003.
Y.F. Sit, C.L. Wang, and F. Lau, "Cyclone: A High-Performance Cluster-based Web Server with Socket Cloning", *Cluster Computing* vol. 7 Issue 1, pp. 21-37, Kluwer Academic Publishers, Jul. 2004.
Sit, Yiu-Fai et al., "Socket Cloning for Cluster-Based Web Servers", Department of Computer Science and Information Systems, The University of Hong Kong, Proceedings of the IEEE International Conference on Cluster Computing, IEEE 2002.
Snell, Quinn et al., "An Enterprise-Based Grid Resource Management System", Brigham Young University, Provo, Utah 84602, Proceedings of the 11th IEEE International Symposium on High Performance Distributed Computing, 2002.
Tang, Wenting et al., "Load Distribution via Static Scheduling and Client Redirection for Replicated Web Servers", Department of Computer Science and Engineering, 3115 Engineering Building, Michigan State University, East Lansing, MI 48824-1226, Proceedings of the 2000 International Workshop on Parallel Processing, pp. 127-133, IEEE 2000.
S. Taylor, M. Surridge, and D. Marvin, "Grid Resources for Industrial Applications", In *Proceedings of the IEEE International Conference on Web Services (ICWS 04)*, pp. 402-409, San Diego, California, Jul. 2004.
D.P. Vidyarthi, A. K. Tripathi, B. K. Sarker, A. Dhawan, and L. T. Yang, "Cluster-Based Multiple Task Allocation in Distributed Computing System", In *Proceedings of the 18$^{th}$ International Parallel and Distributed Processing Symposium (IPDPS'04)*, p. 239, Santa FE, New Mexico, Apr. 2004.
D. Villela, P. Pradhan, and D. Rubenstein, "Provisioning Servers in the Application Tier for E-commerce Systems", In *Proceedings of the 12$^{th}$ IEEE International Workshop on Quality of Service (IWQoS '04)*, pp. 57-66, Jun. 2004.
US 7,774,482, 08/2010, Szeto et al. (withdrawn)

\* cited by examiner

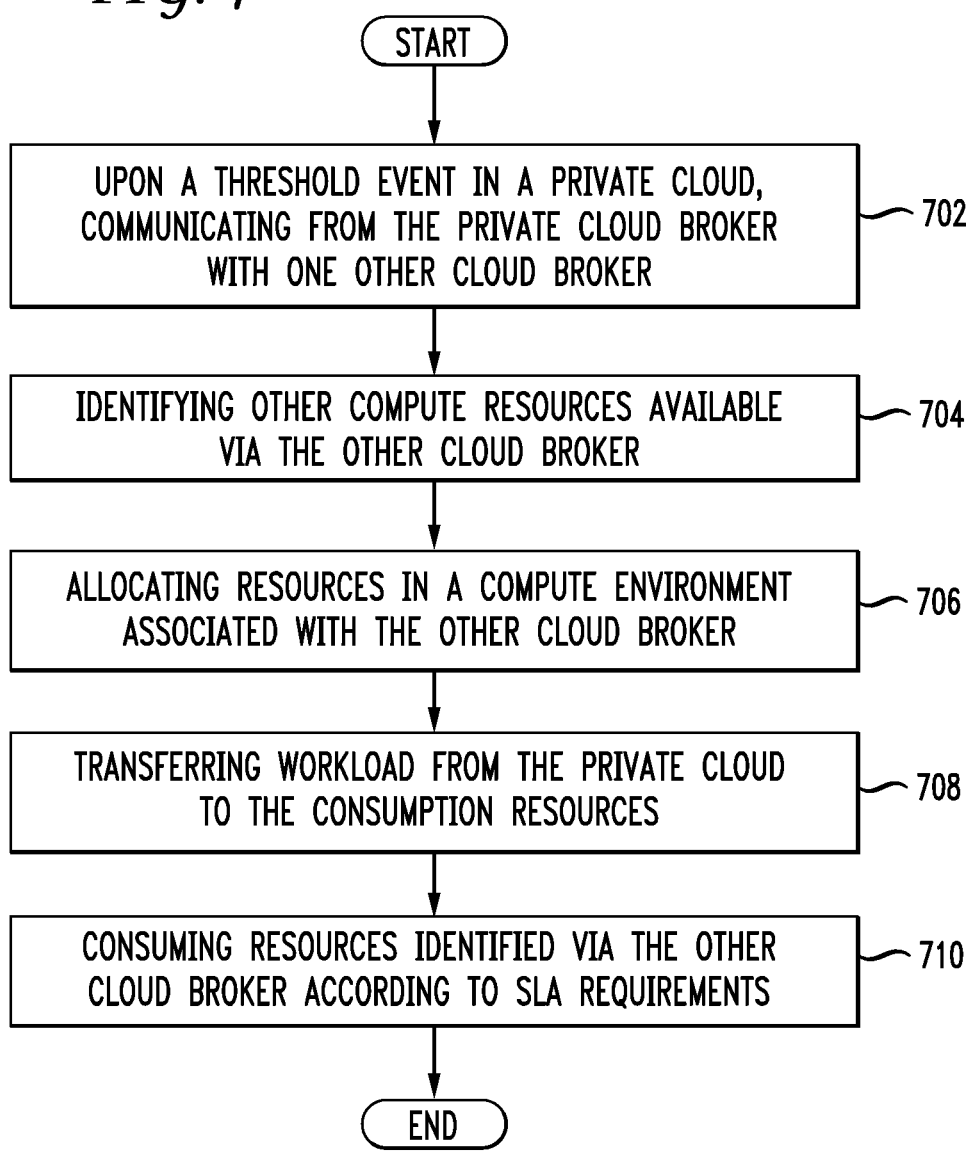

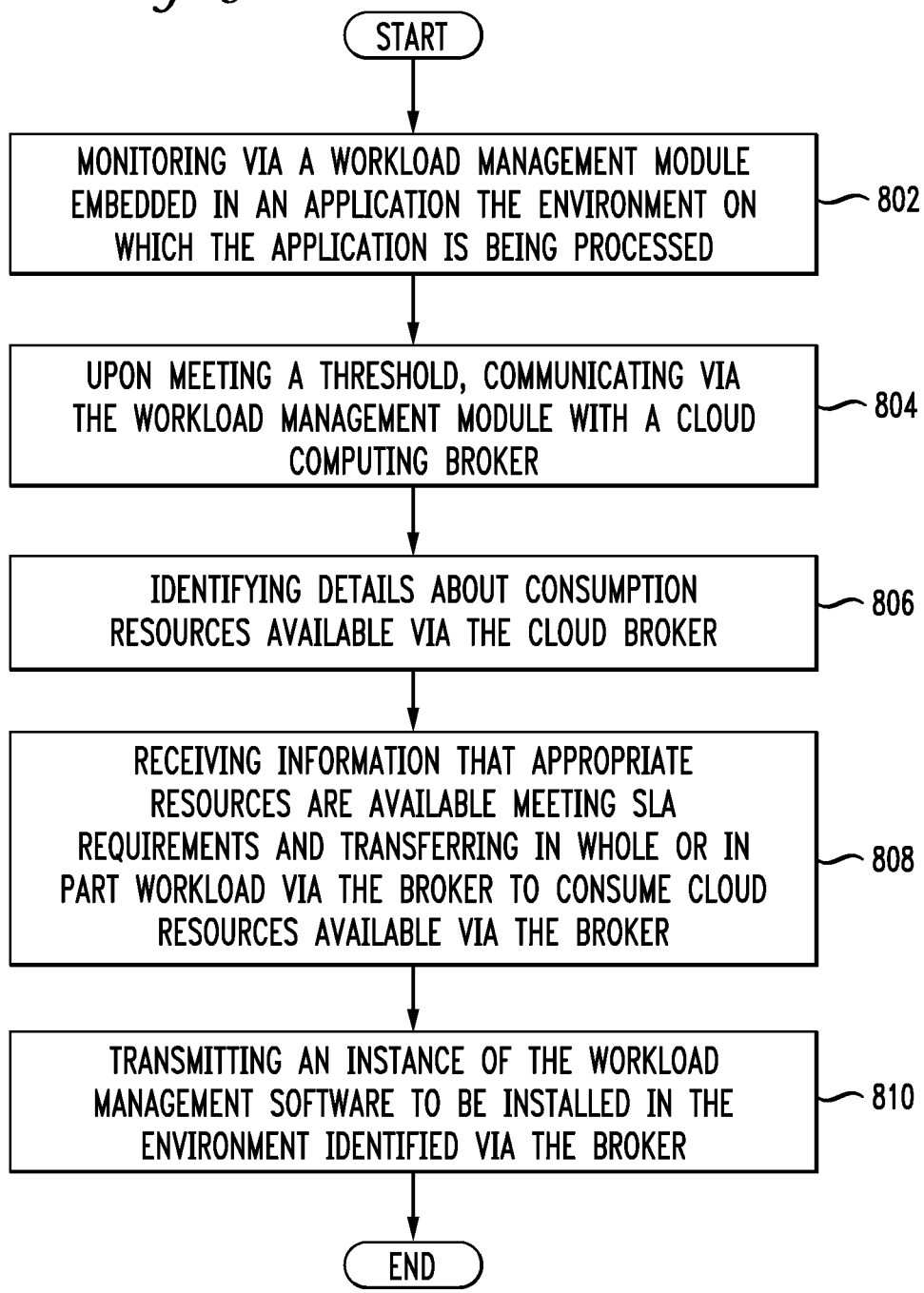

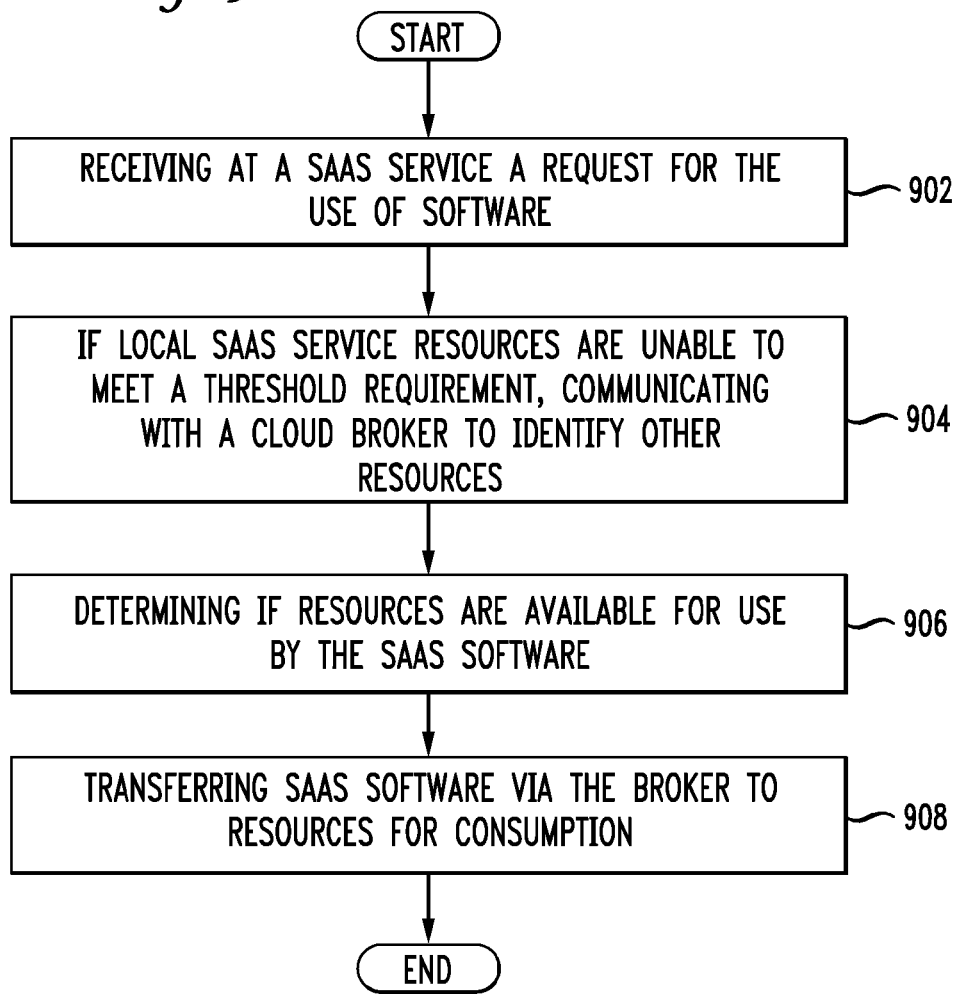

SYSTEM AND METHOD OF BROKERING CLOUD COMPUTING RESOURCES

PRIORITY INFORMATION

The present application is a continuation-in-part of U.S. patent application Ser. No. 12/752,622, filed Apr. 1, 2010, which is a continuation of U.S. patent application Ser. No. 11/276,856, filed Mar. 16, 2006, now U.S. Pat. No. 7,698,430, which claims the benefit of U.S. Provisional Patent Application No. 60/662,240, filed Mar. 16, 2005 and the present application is also a continuation of U.S. patent application Ser. No. 12/503,424, filed Jul. 15, 2009. The contents of each of the above-identified applications are incorporated herein by reference in their entirety.

BACKGROUND

1. Technical Field

The present disclosure relates to managing computer resources and more specifically to brokering access to resources in multiple compute resource environments, such as multiple private and/or public clouds.

2. Introduction

Cloud computing is described as a mechanism of providing scalable and virtualized compute resources over the Internet to the public or internally for a company, university, or other organization. Typically a computing cloud is made up of a group of individual computers connected by high-speed communications and some form of management software guiding the collective actions and usage of the individual computers. However, other cloud configurations exist. For example, FIG. 2 illustrates an example environment 200 in which a submitter 208 can choose from a number of clouds 202, 204, 206 to submit workload for processing. Currently, a number of vendors provide cloud computing services, including Google™, Amazon®, and Yahoo®. FIG. 2 shows cloud 1 202, cloud 2 204 and cloud 3 206. Typically these clouds are accessed via the Internet 210.

The infrastructure in a cloud is a data center with numerous servers typically with different levels of virtualization technologies. Access to each cloud is presented as a single point for the computing needs of customers. Often service level agreements (SLAs) with each cloud will exist which promise or guarantee a particular quality of service which can meet the requirements of a submitter 208.

Many advantages exist for cloud computing, including the ability of companies to avoid capital expenditures by only paying for consumed resources that they use. Some challenges also exist with the current state of cloud computing. One issue is with individual cloud vendors. Users may be limited to the service levels and applications or service providers that the cloud vendor 202, 204, 206 is willing to offer. Users may have limited ability to install applications and to perform certain tasks. Only particular operating environments may be available which do not match or have an affinity to a user's workload. In some cases, experts have argued that cloud computing is regression to the mechanism of mainframe computing prior to the 1970's.

Another feature of cloud computing is also shown in FIG. 2. In this example, assume that each submitter has its own cloud 212. This could be termed a private cloud which is an internal on-demand center for an entity such as a large company. Clouds 202, 204, 206 may be public clouds and companies such as IBM provide integration services to enable submitters 208 with private clouds 212 utilize a hybrid environment in which overflow workload transfers from a private cloud 212 to one of the public clouds 202, 204, 206. In this manner, a hybrid cloud can span both the corporate data centers and public services. However, a submitter 208 must identify and submit work to each cloud individually. This generally requires some kind of business relationship with one or more clouds, which can be cumbersome, expensive and administratively difficult for the owner of private cloud 210. The submitter 210 may use different cloud computing environments. The capability for this hybrid environment can be enabled by a combination of servers such as IBM's Blade Center HS22 Intel-based Blade Servers, the IBM Tivoli Service Management, monitoring and provisioning tools as well as VMware Virtualized Images and other software that can support specific workload types. Such hybrid environments, while enabling companies to run normal workloads in a private data center 212 and transmit overflow data and applications to public clouds, still suffer from some of the same issues set forth above.

SUMMARY

Additional features and advantages of the disclosure will be set forth in the description which follows, and in part will be obvious from the description, or may be learned by practice of the principles disclosed herein. The features and advantages of the disclosure may be realized and obtained by means of the instruments and combinations particularly pointed out in the appended claims. These and other features of the present disclosure will become more fully apparent from the following description and appended claims, or may be learned by the practice of the principles set forth herein.

Disclosed are systems, methods and tangible computer-readable storage media which provide improved and simplified access to cloud computing services. The method is computer-implemented and is preferably performed via one or more processors in a computing device or system. The method includes, at a brokering service system, periodically polling a group of separately administered compute environments to identify resource capabilities and/or other data associated with the environment such as availability, cost, reliability, etc., each compute resource environment including a group of managed nodes for processing workload. Preferably, each compute resource environment registers with the brokering service system. The brokering service aggregates resources for multiple cloud service environments and presents a single united interface to users. The brokering service system can preferably be a server or servers with the necessary communication mechanisms known in the art to communicate between outside users and more than one separately administered compute environments.

An example of separately administered compute environments can be individual public clouds provided by a company such as IBM®, Amazon®, Google™, Microsoft®, Yahoo® and so forth. As noted above, an example public cloud can be a combination of IBM's Blade Center HS22 Intel-based Blade Servers, IBM Tivoli Service Management, monitoring and provisioning tools, VMware Virtualized Imaging Software and other software designed to support specific workload types. Another example workload management software is the Moab workload manager and other management products from Cluster Resources, Inc. In one respect, such clouds have been termed a "public cloud" or "external cloud". Other clouds may include a "private cloud" or an "internal cloud" which may be managed and only available internally in the government, a corporation, or other organization.

The method further includes receiving a request for compute services at the brokering system, the request for compute resources being associated with a service level agreement and, based on the identified resource information across the group of compute resource environments, selecting compute resources in one or more of compute resource environments. The method next can include receiving workload associated with the request and communicating the workload to the selected resources in the group of compute resource environments for processing. The selection of compute resources ensures that the processing complies with the service level agreement.

This disclosure provides a mechanism through the use of the brokering service system of providing a standardized portal or environment for submitting workload to one of a number of compute resource environments or clouds. This single interface to various clouds can improve the marketability and availability of cloud computing and greatly simplify the process for submitters whether they be individuals or companies. The brokering service system not only is an advocate for ensuring that service level agreements are complied with by the selected resources of the group of clouds, but can also provide the necessary translations in order to accommodate and match the workload with the selected resources in one or more of the group of clouds. In other words, the brokering service system can translate or modify the workload because it was not programmed or configured for the selected environment. In one example, assume that the workload has an affinity for being processed on a Microsoft operating system. The affinity can be a soft or a hard requirement. An example of a soft requirement is an application that processes data 30% faster in a Microsoft environment. The affinity is desirable, but not necessary. An example of a hard requirement is an application that relies on core libraries that are only available in a Microsoft environment. This affinity is a necessary requirement. However, the brokering service system has selected resources within a cloud that are running at the Linux operating system. The brokering service system can either modify the workload so that its affinity is more suitable to a Linux operating system environment, if possible, or the brokering service system can reprovision the Linux nodes with a Microsoft operating system and then submit the workload into those resources for consumption in an environment that has been modified to better suit the workload itself. The brokering system can also monitor the environments and if nodes with the Microsoft operating system become available it can migrate a reservation of nodes to new nodes which better fit the workload which is yet to consume compute resources. In this manner, the brokering services system provides easy and efficient accessibility to resources within multiple clouds.

BRIEF DESCRIPTION OF THE DRAWINGS

In order to describe the manner in which the above-recited and other advantages and features of the disclosure can be obtained, a more particular description of the disclosure briefly described above will be rendered by reference to specific embodiments thereof which are illustrated in the appended drawings. Understanding that these drawings depict only exemplary embodiments of the disclosure and are not therefore to be considered to be limiting of its scope, the principles will be described and explained with additional specificity and detail through the use of the accompanying drawings in which:

FIG. 7 illustrates another method embodiment;
FIG. 8 illustrates another method embodiment;
and
FIG. 9 illustrates yet another method embodiment.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Figure 1:
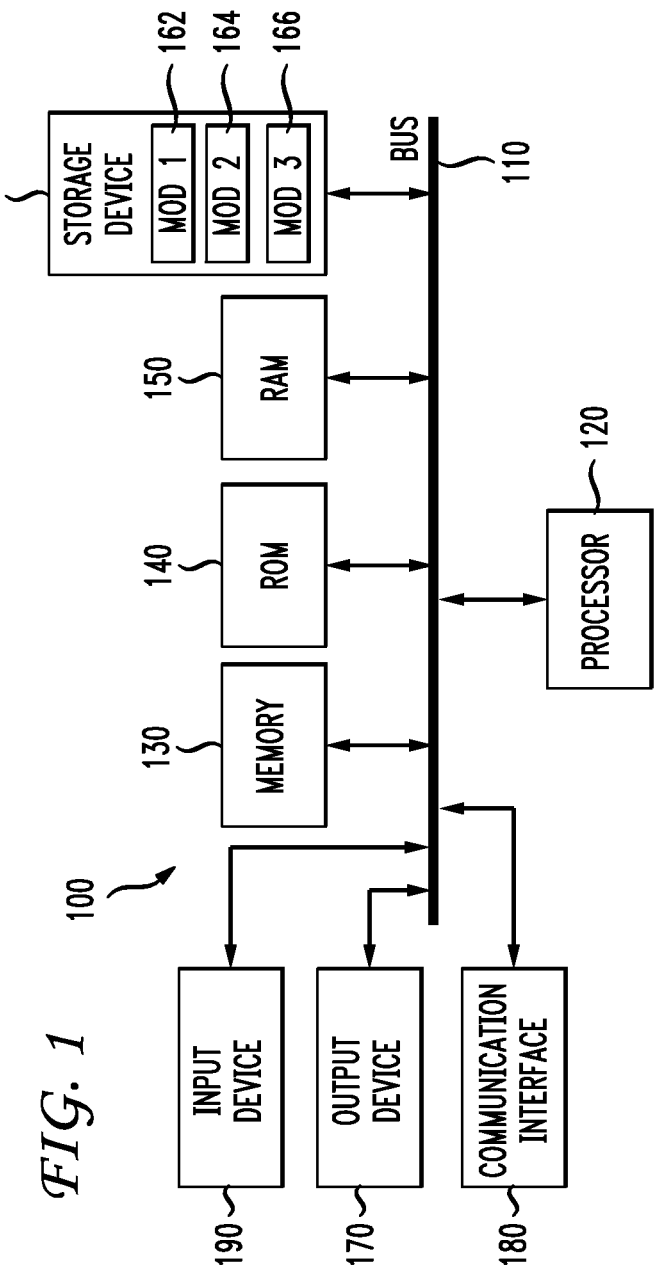
FIG. 1 illustrates the standard system.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. These and other modules can be configured to control the processor 120 to perform various actions. Other system memory 130 may be available for use as well. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a tangible and/or intangible computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Tangible computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. The input device 190 may be used by the presenter to indicate the beginning of a speech search query. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage media. Generally speaking, such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2:
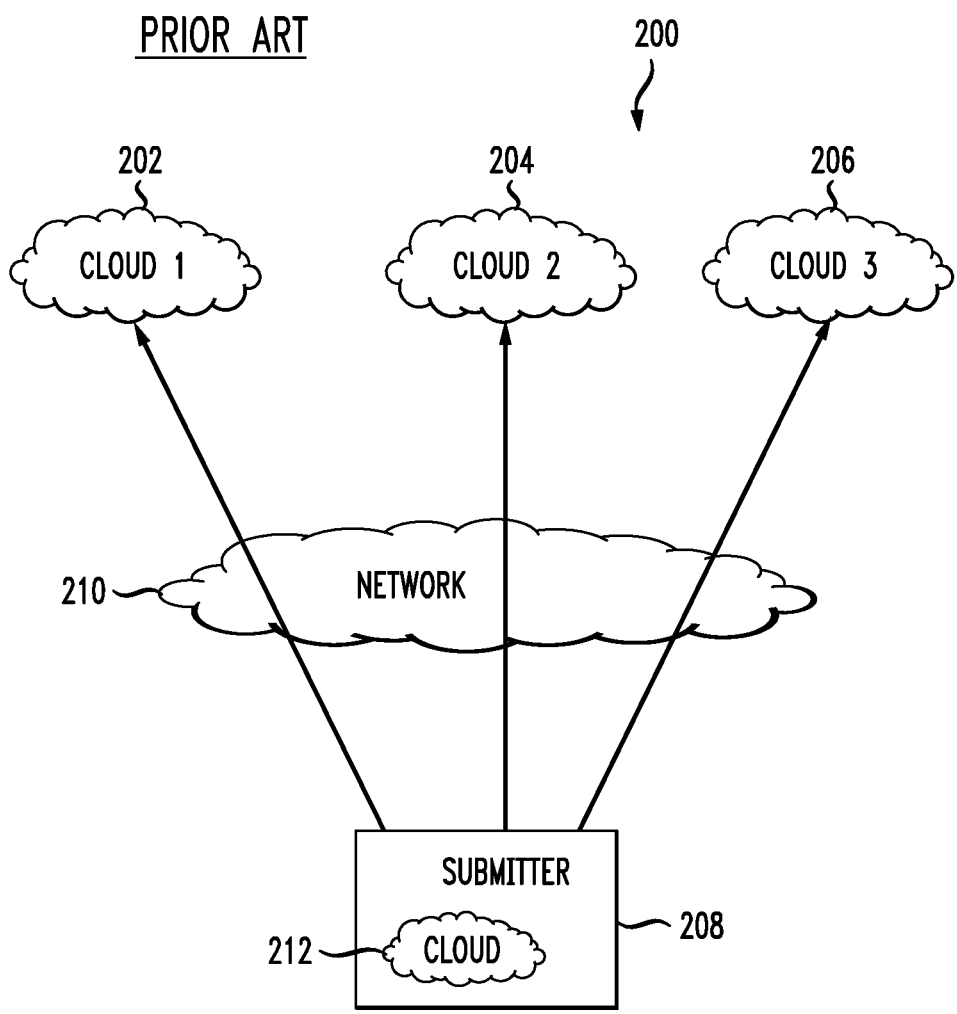
FIG. 2 illustrates a prior art approach to accessing cloud computing.

FIG. 2 illustrates an example prior art approach to cloud computing. Cloud 1 202, cloud 2 204 and cloud 3 206 can represent a mixture of public clouds and/or private cloud. Again, a public cloud provides resources which may be accessible by the public or companies which are provisioned and available on a self-service basis over the Internet or other network 210 via a web application. The public cloud has the ability to enable fine-grained knowledge and control of the use of resources in the cloud by individual users and can track and bill users on that basis.

A private cloud can provide an entity managing the cloud enhanced data security, corporate governance and reliability. An illustration of a private cloud is shown in FIG. 2 as cloud 212 associated with the submitter and inaccessible to outside compute jobs. As noted above, one example of the use of cloud computing is the ability of a service to simply provide overflow computing services from a company's private cloud 212 into one or more public clouds 202, 204, 206. The configuration of each of these clouds is generally known to those in skill of the art. For example, a cloud may use IBM's Blade Center HS22 Intel-Based Blade Servers, a workload management software for management, monitoring and provisioning. Virtualization software from VMware and other software may be implemented in order to manage the workload in any particular cloud. Such virtualization approaches can incur an additional cost that companies must buy, build, pay for and manage in public and/or private clouds. Typically private clouds 212 are used to be highly flexible compute resources for an enterprise which may be used in management for the compute needs of that enterprise. A private cloud 212 may also be made available to partners within a supply chain or other trusted third-parties to gain access to all or part of the private cloud of any individual company. For example, a company can allow third-party access to data stored in a private cloud, but not processing power, or vice versa.

Figure 3:
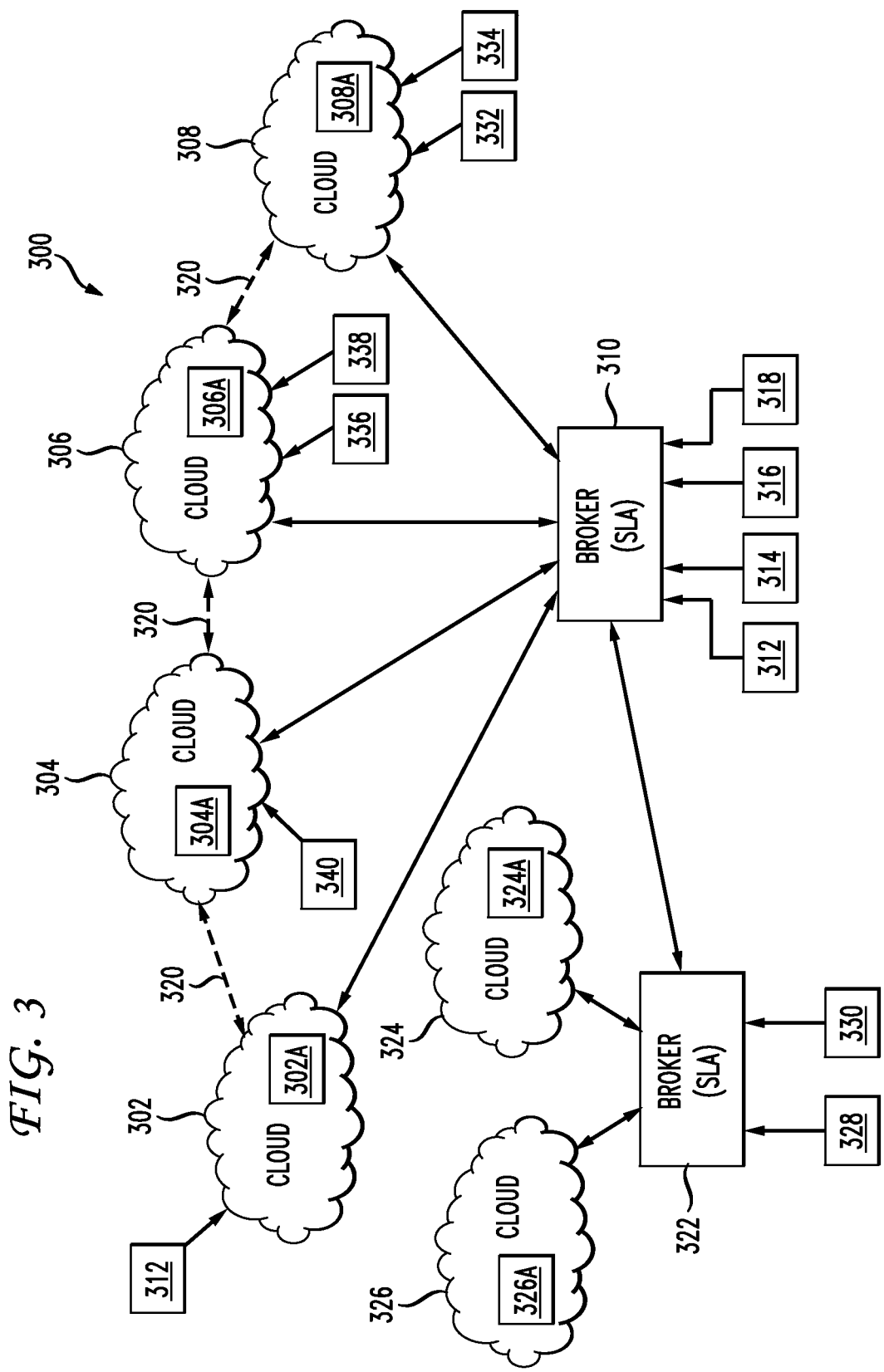
FIG. 3 illustrates an example brokering service.

FIG. 3 is an example environment 300 illustrating the principles of the present disclosure. Broker 310 represents a system or a device such as that shown in FIG. 1 or a group of servers or devices combined together to manage the requirements of and be able to perform the processes disclosed herein. Other hardware configuration hereinafter developed may also be used for the brokering system or device, which configurations are incorporated herein by reference and would be known to those of skill in the art.

Brokering system 310 receives requests from users 312, 314, 316 and 318. An example of these users may be individual users with processing needs, companies which have jobs which need to consume resources, or any other entity that needs compute resources. Clouds 302, 304, 306 and 308 represent primarily public clouds which are available to process jobs according to the user needs but can also represent in some cases private clouds as well. For the purposes of the discussion in FIG. 3, the clouds illustrated are public clouds unless stated otherwise. However, the clouds shown can be a combination of public and private clouds.

As noted above, each cloud 302, 304, 306, 308 may have differing characteristics. The broker 310 polls each of the respective clouds in order to identify the various capabilities and characteristics including any type of parameter associated with each respective cloud. An example of the different characteristics may include different resource types, a different cost per unit of a compute resource, the type of energy which is used to power the compute environment, SLA availability and parameters offered, and so forth. One compute environment may be powered by wind power, while another from a coal-fired power plant, or a nuclear power plant. Another cloud 308 may be powered by biofuel. Accordingly, one parameter which can be identified is the cost of the energy which may be required to power and cool the individual cloud.

Other parameters include the service level agreements which are warranted by the respective clouds, 302, 304, 306, 308. For example, a cloud 302 may provide a five cents per unit cost but only be able to provide a mid-level service level agreement and a low-level reliability for the processing of jobs submitted to that environment. Environment 304 may have a high-level service level agreement that is warranted but its cost may be eight cents per unit. Accordingly, each environment 302, 304, 306 and 308 will typically be managed by a workload manager or some other management software that will determine how resources within each environment are consumed. For example, module 302A, 304A, 306A and 308A generally represent this system which will manage the resources in these various environments. The examples of what are managed of course are compute jobs that are submitted into each cloud such as jobs 342, 340, 338, 332, and 334. Typically third party requesters submit jobs directly to each respective cloud. A job represents any computing or other workload that a consumer resources in the compute environment such as a weather analysis, an accounting task, or database search, etc.

The ability of the brokering service system to act as a broker to more than one cloud environment is enabled by its periodically polling the group of separately administered compute environments 302, 304, 306 and 308 to identify the resource capabilities and information. In one variation, each separately administered compute environments 302, 304, 306, 308 reports to the brokering service system 310 when its resource capabilities/information change instead of or in combination with the brokering service system 310 polling the environments. Resource capabilities also encompass any parameter associated with the environment such as cost per consumption hour, availability of resources, types of resources, a need for provisioning of particular software or operating systems, cost of associated human labor, and so forth. Another example of this type of provisioning can be illustrated by brokering services system 310 identifying that cloud 302 primarily offers a Linux operating system with an inexpensive rate, but only a mid-level service level agreement guarantee. Compute environment 304 may offer a hybrid Microsoft and Linux operating environment with a high service level agreement guarantee but with a more expensive cost per unit (such as per node per hour or any other unit used to identify cost). Other parameters may be identified as well, such as the processor speed for processors in each server in the environment, a data through-put speed, hard drive latency or accessibility speed, and so forth. Each compute resource environment typically includes more than one managed node for processing the workload in each environment. In order to communicate with and function with broker 310, each compute resource environment will register with the brokering system. In one aspect, a cloud does not register but does make data available information to the broker 310 for determining whether to send workload.

The brokering system 310 in advance can develop a relationship with a number of clouds which can be any combination of public and private clouds. As shall be discussed herein, the ability of the broker to identify, aggregate, communicate, and manage compute resources across a number of different clouds can greatly simplify the ability of workload to be processed on compute resources that match SLA requirements for the requestors 312, 314, 316, 318, 322. In other words, the broker 310 provides the most easy and efficient supply chain management between a user who desires compute resources for workload and the consumption of selected resources by that workload. Clouds may also have restrictions on the types of resources that are available, or the types of users (such as those with a certain security level) that can use resources within the respective environment.

Users 312, 314, 316, 318 can submit workloads to the broker 310 which then identifies suitable public and/or private clouds and submits the job on behalf of the user. Users 312, 314, 316, 318 can query a broker to determine which public and/or private clouds are capable of servicing the workload within the SLA terms. Users submit jobs directly to the appropriate cloud(s) based on information from the broker 310. Therefore, rather than transmitting workload, the broker 310 just passes information about the clouds to the requestor. In the case of direct to cloud submissions, the workload can include a referral code or other identifying information which indicates that the broker 310 directed the user to the particular cloud(s). The broker can offer both of these services simultaneously.

The brokering services system 310 may utilize software that communicates seamlessly with management software in the various compute environments. For example, if the brokering service system 310 utilizes Moab, the Moab workload manager or any of its various components from Cluster Resources or from Adapted Computing Enterprises, and the workload management module 302A in compute environment 302 also utilizes the same workload management software, there can be a direct ability to identify with a high level of confidence the capabilities and resources available in cloud 302. However, if another cloud 304 utilizes a different type of workload management module 304A, then the necessary translations, estimations or intelligent predictions of the resource capabilities of a particular environment 304 can be performed by the brokering services system 310. Accordingly, there can be a confidence level associated with the knowledge that is received from polling the separately administered compute environments. The brokering system 310 can adapt workload distribution as the confidence level changes and as learning algorithms interact with and record metrics associated with various environments.

Other information which may be identified includes the quantity, capability, likelihood of failure and so forth of the particular environment. Again, without a match in the workload management software between the broker and any respective cloud, or if a cloud is not registered with the broker, an effort will be made from the broker to query for the status, cost, statistics and so forth of any cloud it can communicate with. Although it is likely that the amount of information associated with that cloud will be reduced, as is discussed more fully below, learning algorithms are used to gather additional data associated with a respective cloud based on the consumption of workload within that cloud. Accordingly, the broker 310 will improve over time its ability to identify resources for clouds that it cannot gain full information about.

Individual clouds may or may not register with the broker. Registering with the broker involves providing a sufficient communication link and contractual understanding between the broker and the registered cloud for the brokering of cloud services through broker 310. Such a registration improves the communication and ease with which end users will be able to access cloud computing services through the broker 310. But again, the disclosure notes that even for unregistered clouds, some information may be obtained and thus workload can still flow to an unregistered cloud for consuming resources. When a user submits a workload, the user can indicate a preference for registered or unregistered clouds.

The polling of each of the separately administered compute environments or clouds can occur on a static periodic basis or dynamically by the brokering service system 310. Any polling basis may be used. For example, it may occur every half hour, daily, or on a per job basis. A large batch job can be submitted every evening at midnight for processing. In preparation for most advantageously ensuring that the optimal compute resources are identified and matched for processing the batch job, this system can automatically schedule to receive an updated polling of all of the separately administered compute environments in order to have a current snapshot of the resource capabilities across the different environments. The service level agreement can require polling at a certain minimum interval.

Having the identified resource capabilities of the various clouds 302, 304, 306, 308, the brokering service system can receive a request for compute resources at a first time. The request is preferably associated with a service level agreement. In other words the request or the requestor can identify various parameters associated with the request. Such parameters can include a required cost, a required performance level, a required guarantee of the availability of resources, an amount of resources, and so on. For example, the requestor can set forth that they desire the cheapest cost with a minimum level of performance. Based on the identified resource capabilities across the compute resource environments, the brokering service system 310 selects compute resources in one or more of the compute resource environments 302, 304, 306, 308. The selection may involve identifying all of the resource being in one environment such as environment 302. In some cases, a job with a workload associated request may be both computationally intensive as well as data intensive. In this case, the broker 310 can identify some resources from one environment 302 and perhaps other resources from another environment 306 and actually split the job up amongst more than one compute environment. The broker servicing system 310 can also instruct or communicate with workload managers in the respective environments to ensure that those resources are reserved or scheduled for processing workload at a second time which is later than the first time as disclosed herein and via the incorporated applications below. In this regard, the broker 310 becomes the enforcer of SLA requirements from the requestor associated with workload.

The process of managing the selection and reservation and actual consumption of resources may use many of the principles in the following patent applications: U.S. patent application Ser. No. 10/530,583, filed Apr. 7, 2005; U.S. patent application Ser. No. 11/751,899, filed May 22, 2007, both disclosing providing advanced reservations in a compute environment; U.S. patent application Ser. No. 10/530,582, filed Aug. 11, 2006 disclosing co-allocating a reservation spanning different compute resource types; U.S. patent application Ser. No. 10/530,581, filed Aug. 11, 2006 disclosing self-optimizing reservation in time of compute resources; U.S. patent application Ser. No. 10/530,577, filed Mar. 11, 2005 disclosing providing a self-optimizing reservation in space of compute resources; U.S. patent application Ser. No. 11/208,138, filed Aug. 19, 2005 disclosing providing dynamic roll-back reservations in time; U.S. patent application Ser. No. 11/629,940, filed Dec. 18, 2006 disclosing providing reservation masks within a compute environment; U.S. patent application Ser. No. 11/268,857, filed Nov. 8, 2005, now U.S. Pat. No. 7,356,770; U.S. patent application Ser. No. 12/033,386, filed Feb. 19, 2008 both disclosing graphically managing and monitoring a compute environment; U.S. patent application Ser. No. 11/155,090, filed Jun. 17, 2005 disclosing using transaction IDs for managing reservations of compute resources within a compute environment; U.S. patent application Ser. No. 11/155,347, filed Jun. 17, 2005 disclosing providing threshold-based access to compute resources; U.S. patent application Ser. No. 10/530,576, filed Mar. 11, 2005 disclosing providing multi-resource management support in a compute environment; U.S. patent application Ser. No. 11/718,867, filed May 8, 2007 disclosing providing system jobs within a compute environment; U.S. patent application Ser. No. 11/155,091, filed Jun. 17, 2005 disclosing providing dynamic provisioning within a compute environment; U.S. patent application Ser. No. 10/589,339, filed Aug. 11, 2006, now U.S. Pat. No. 7,490,325 disclosing providing intelligent pre-staging of data in a compute environment; U.S. patent application Ser. No. 11/276,852, filed Mar. 16, 2006 disclosing providing a virtual private cluster; U.S. patent application Ser. No. 10/530,578, filed Mar. 11, 2005 disclosing providing object triggers; U.S. patent application Ser. No. 10/530,580, filed Apr. 7, 2005 disclosing providing object messages in a compute environment; U.S. patent application Ser. No. 10/530,575, filed Feb. 4, 2008 disclosing enforcing future policies in a compute environment; U.S. patent application Ser. No. 11/207,438, filed Aug. 19, 2005 disclosing interfacing a workload manager and scheduler with an identity manager; U.S. patent application Ser. No. 11/276,013, filed Feb. 9, 2006 disclosing providing a fixed time offset based on a dedicated co-allocation of a common resource set; U.S. patent application Ser. No. 11/276,853, filed Mar. 16, 2006 disclosing automatic workload transfer to an on-demand center; U.S. patent application Ser. No. 11/276,854, filed Mar. 16, 2006 disclosing simple integration of an on-demand compute environment; U.S. patent application Ser. No. 11/276,855, filed Mar. 16, 2006 disclosing reserving resources in an on-demand compute environment; U.S. patent application Ser. No. 11/276,856, filed Mar. 16, 2006 disclosing an on-demand compute environment; U.S. patent application Ser. No. 11/279,007, filed Apr. 7, 2006 disclosing on-demand access to compute resources; U.S. patent application Ser. No. 11/763,010, filed Jun. 14, 2007 disclosing optimized multi-component co-allocation scheduling with advanced reservations for data transfers and distributed jobs; U.S. patent application Ser. No. 11/616,156, filed Dec. 26, 2006 disclosing co-allocating a reservation spanning different compute resources types; U.S. patent application Ser. No. 12/023,722, filed Jan. 31, 2008 disclosing managing a hybrid compute environment; U.S. patent application Ser. No. 12/179,142, filed Jul. 24, 2008 disclosing managing energy consumption in a compute environment; U.S. patent application Ser. No. 12/245,276, filed Oct. 3, 2008 disclosing dynamically managing data-centric searches. Each of these patent applications is incorporated herein by reference.

The various principles incorporated in by reference above provide support to one of skill in the art in order to have necessary background information for brokering of cloud computing services. While any particular algorithm is not necessary for enabling the principles disclosed herein, the information will be helpful to one of skill in the art. Such principles include various methods for managing advanced reservations in a compute environment, collocating a reservation, spanning different compute resource types, self-optimizing reservations in time and or space, providing dynamic rollback reservations in time, providing reservation masks within a compute environment, providing transaction IDs for managing reservations in compute resources, providing threshold-based access to compute resources, providing multi-resource management support, providing system jobs, providing dynamic provisioning, providing intelligent pre-staging of data, providing a virtual private cluster, providing object triggers, providing object messages, enforcing future policies, interfacing a workload manager and scheduler with an identity manager, providing fixed-time offset-based dedicated co-allocation of common resource sets, workload transfer to an on-demand center, simple integration of an on-demand compute environment, reserving resources in an on-demand compute environment, on-demand access to compute resources, optimizing multi-component co-allocation scheduling with advanced reservations for data transfers and distributed jobs, co-allocating a reservation spanning different compute resource types, managing a hybrid compute environment such as having multiple operating systems that may be provisioned and repositioned according to workload need and managing energy consumption in the compute environment.

After the broker 310 utilizes its relationships with the various clouds 302, 304, 306, 308 and gathers the necessary data from each of the clouds, as it receives requests for processing workload, it can analyze all of the clouds using the various principles set forth above and disclosed herein to select the appropriate resources in one or more clouds for processing the workload. In one example, requestor 312 may include in their SLA requirement that is enforced by the broker 310, a requirement that if its workload is being processed in cloud 308, that if their performance level drops below a threshold or there is a failure of services from cloud 308, that the broker 310 can intelligently apply those policies that can then migrate 320 workload to another cloud 306 with the beneficial result of providing business continuity for its computing requirements. In this respect, the present disclosure provides control of the SLA to be with the consumer. The broker 310 may only need to engage in a consumer agreement with various cloud providers and utilize that consumer agreement amongst multiple clouds in order to successfully act as a broker for third party requestors. The more clouds registered with or in communication with the broker, the better service that the broker can provide to third party requestors and the wider the variety of possible SLA requirements the broker can enforce.

The broker 310 can provide brokering services in several ways. First, the broker may provide information only. In this case, the requestor 312, 314, 316 or 318 may simply receive information back about available resources. For example, the information may be that cloud 304 is offering a discount for processing a workload assuming that a user can wait 24 hours. The broker 310 can engage in interaction with the submitter and manage the relationship between the respective cloud and the user to receive a commitment that the user will accept and then manage receiving the workload and transmitting it to the selected resources in the respective cloud or clouds.

In another aspect, the broker 310 selects the appropriate resources (based on factors disclosed herein) and then route the received workload to those selected resources. The selected resources can be reserved and managed by the workload management software 302A, 304A, 306A, 308A. Requesters 312, 314, 316 and 318 provide workload to the broker 310 which then communicates the workload to the selected resources in one or more of the compute environments. Brokering service system 310 can be an advocate for or a guarantor of the service level agreement (SLA) associated with the request. The individual environments 302, 304, 306 and 308 provide respective SLAs, but the analysis done by the broker 310 can enforce a SLA requirement associated with the workload or requester. One of the concepts disclosed herein is that the broker 310 is the guarantor of an SLA although it does not provide compute resources per se to the requestor. By being a brokering system, broker 310 can identify the resources that will ensure compliance with the requestor SLA. This can be accomplished by reserving resources based on SLAs, migrating reservations to maintain SLA requirements, or other means.

In some instances, the workload itself may need to be modified or prepared to match the selected compute resources. For example, the selected resources may be running the Microsoft operating system and the workload was initially prepared or primarily designed to be processed on a Linux operating environment. The brokering service system 310 can evaluate and process, if necessary, workload associated with the request for compute services resources in order to match the workload with the selected compute resources. The appropriate modifications can be made and thus ensuring that the workload when it ultimately consumes resources within the environment will do so efficiently and quickly. In some cases, different stages of a compute job are optimally executed in different compute environments. In such cases, the broker can establish a compute job workflow between multiple nodes or clouds which provide the optimal compute environment for that particular stage. For instance, the compute job workflow can prepare initial data in a Linux environment, process the data in a Windows environment, and prepare reports in a BSD environment. The broker can appropriately establish a pipeline between multiple nodes or clouds so the compute job is processed in an optimal environment in an optimal location at each stage.

In another example, the broker 310 can determine that rather than translating or modifying the workload, the selected resources within the one or more clouds can be modified or reprovisioned in order to have more affinity for the workload. Taking the above example, if the workload was initially prepared or primarily designed to be processed in a Linux operating environment, the broker 310 can reprovision a Microsoft environment to a Linux operating environment and in essence create a virtual private cluster or a virtual private cloud within a larger public cloud and then transfer the workload to that environment for consumption. In this manner, the present disclosure provides a standardized brokering environment for communicating workload into the cloud. Providing a single interface to the various clouds greatly simplifies the ability of any individual and user to obtain cloud computing services that match or meet their SLA requirements without the need to individually poll or communicate with various cloud service providers.

Once the workload is communicated to the selected compute environment to the selected resources which can span one or more of the compute environments, the brokering system server 310 can further analyze parameters associated with how the selected compute environment is processing the communicated workload and if a particular threshold is met, identify and select new compute resources from the compute resource environments and migrat all or part of the communicated workload to the selected new compute resources. This migration can be represented by line 320. In this case, the broker can communicate with the various workload management modules 302A, 304A, 306A, 308A within each environment and inasmuch as the broker 310 has a more global view of workload and resources amongst the multiple environments, it can manage the migration of workload to new compute resources.

One example of where this can be helpful can include the ability of the broker 310 to keep prices low by moving workload to new environments that are always processing at night when the resources are cheaper (i.e. when electricity prices are off-peak) and the environment is operating at a cooler temperature. For example, if a particularly large job were to take 24 hours to process, broker 310 can continue to migrate the processing of the workload to new compute environments throughout the world during the 24 hour period to ensure that it is always processed at night. Any type of threshold associated with the processing of the workload can apply. For example, if a particular workload requires a high-level of reliability of the resources, and if the workload is currently being processed in cloud 304 but a threshold becomes met which involves the reliability of the availability or the continued availability of resources in cloud 304 drops below a particular threshold, then the broker 310 can manage the migration of those resources to cloud 306 which maintains a high-reliability report and expectation.

In another aspect, the broker 310 can manage the ability to provide "hot-hot" processing for the workload. The broker can identify two similar but separate sets of compute resources which may be in the same environment or may span different environments, which can in parallel or alternately process the workload. Assume that workload is processed partially in cloud 302 and partially in cloud 304. The broker 310 can manage data or processing such that it alternates between the resources in cloud 302 and other resources in cloud 304 such that the reliability of the job not failing can dramatically increase inasmuch that as both separate sets of resources are "hot" and currently processing portions of the workload. If one of the sets of resources goes offline or goes down, then the other set can immediately continue to process all of the remainder of the job.

In another aspect, the broker 310 can select resources including one set in one compute environment that process the workload and the back-up set of resources in the same or different compute environment that does not process the workload unless the one set of compute resources is unable to process the workload according to the service level agreement. A "hot-cold" environment creates a back-up set of resources reserved and made available in case the primary processing resources become unavailable or unable to process the workload. In this manner, a requestor 312, 314, 316, 318 can request any variety of environments for processing their workload beyond just identifying x number of nodes, and have that environment identified, selected, reserved and made available throughout multiple clouds. Therefore, in addition to SLA requirements, the broker 310 can configure increasingly complex environments for workload according to the requestor's desires and needs.

A "hot-cold" environment can have a size 5 primary operating environment which is reserved and allocated for processing workload, while simultaneously reserving a size 3 back-up environment which, if necessary, can stand by and process the workload if the size 5 primary environment experiences a power failure or some other event which eliminates its ability to process the workload. The size 3 back-up environment may take longer to process the workload but less then the full amount of resources are limited as back-up resources in the size 3 environment when compared to the size 5 primary environment. In this respect, the broker 310 can manage complicated arrangements for users in order to seek to provide the best services and back-up capabilities as is desirable or affordable.

In another example, two workloads are separate but related and share at least a portion of a same set of input data. The broker 310 can place the two workloads in close proximity to each other, possibly even within the same physical facility, so that each workload can easily share the same dataset with reduced latency rather than duplicating the input data to two locations. This approach can be useful to minimize reserved storage space and possibly reduce the cost to the customer for performing the workload. The broker 310 considers the SLA requirements for both workloads when selecting where the workloads should be processed.

FIG. 3 further illustrates another aspect of the present disclosure which involves workload being communicated between brokers. A secondary broker 322 is illustrated which communicates with compute environments 324 and 326. Each of these has respective workload management modules 324A and 326A. Users 328 and 330 can submit requests and workload to broker 322. One broker 322 can communicate with another broker 310. All of this can be done transparent to the end users. Broker 322 may not be able to find ideal or satisfactory compute resources within environments 324, 326 but may need to communicate the request to broker 310. Inasmuch as broker 310 has access to more environments and more available resources, part or all of the workload submitted by a user 328 may need to be communicated from broker 322 to broker 310 in order to satisfy the service level agreement associated with the request from the user 328.

Broker 310 can also control the access to the resources within the compute environment based on an authorization associated with the submitter of the request. For example, the requestor 312 may be a government employee or unit with a high security requirement. In this case, with that information communicated to broker 310, the broker may only poll or only evaluate resources within the environment 306 and 308, which may be behind a government firewall, internal to the government or have a sufficiently secure system in order to process the workload. The particular available workload compute resources from the resource environments is narrowed or only available for selection based on the authorization associated with the submitter 312 of that request.

Having the broker 310 communicating with submitters 312, 314, 316, 318 and with the various compute environments enables the broker 310 to obtain knowledge about the desires and needs of individual requestors. Parameters associated with the known needs of the submitters, their type of workload, how previously selected resources processed that workload, and so forth can be used to select advertisements that are presented to a requestor from the brokering service system 310. Fees may be charged to the requestor for the brokering of compute services which may be flat fees, a percentage of the fee which is charged to the individual environments 302, 304, 306, 308 for the consumption of resources within those environments, fees for advertisements, click through fees, and so forth. It is contemplated that any number of mechanisms may be used to charge users for the use of the resources and the opportunity to use the brokering service.

The broker server 310 can provide a customer with a graphical display of progress and location of submitted compute jobs within various public and private clouds. The customer can manipulate or suggest different courses of action to the broker server 310 through the graphical display and see in advance the potential outcomes of such suggestions. For example, the user can suggest splitting the workload over three clouds instead of over two clouds. Feedback on cost and availability of such as approach can then be presented to the user. The system can demonstrate real-time performance metrics of the current configuration and project performance of the suggested change. In this way, the broker server 310 can allow users to select less than optimal compute environment(s) for security, personal preference, benchmarking, or other reasons. The customer can also provide the broker server 310 with performance information and characteristics of the customer's private cloud. In this way, the broker server 310 can calculate differential metrics with respect to expected workload performance of the customer's private cloud and the broker's allocation of the workload. For instance, the broker server 310 can show that the job is being performed at an overall time savings, money savings, or some other absolute, relative, or time-based metric.

Additionally, the knowledge that is obtained both about individual requestors, their type of workload and how previously selected resource efficiently and appropriately process that workload can be used to make improved selection choices. As workload is processed by either registered or non-registered clouds, information is gathered and stored and analyzed associated with how that cloud performs. As further intelligence is gathered, improved choices are made in terms of selected resources. For example, additional selections by the broker 310 may avoid the non-registered cloud based on its performance. Individual servers within clouds may be utilized to make improved decisions in the future. As noted above, registered clouds or clouds that use complementary workload management software to that used by the broker 310 will enable more confidence in the data obtained for each cloud and thus the learning algorithms may improve even quicker the identification and selection of resources for managing workload. As an example of this in operation, assume that every Friday night a large accounting company has a large batch job that is processed over the weekend for providing updated data Monday morning. As the batch job is processed week after week, the broker 310 in running its learning algorithms may initially select resources from cloud 302 but over time may consistently identify the best resources are combined between clouds 304 and 306. In this case, later the workload may either be migrated during processing or the initial selection of resources will be selected for the similar type of batch job that is periodically received for processing by the broker 310. As noted above, techniques such as co-allocation, timing, weighting of the data, and using all of the information that is achieved when identifying and analyzing the various resources, are utilized for finding and reserving resources within one or more of the group of clouds to ultimately provide the resources.

Decisions on which resources to select from the group of clouds can be made based at least in part on a co-allocation analysis of different types of resources. For example, CPUs and data accessing speeds for hard drives illustrate the co-allocation process. Inasmuch as co-allocation involves different types of resources, the most suitable resources for any particular workload may span different cloud computing sites. Inasmuch as the broker 310 has more of a global view of all of the various clouds, a co-allocation analysis may provide the best resources for any given workload whether those resources spanned multiple clouds.

One mechanism by which workload can be communicated through the broker 310 to an individual cloud can be to provide an instance of workload management software actually within the selected cloud. For example, assume that requestor 312 requests compute resources and broker 310 selects cloud 304 to provide those resources. Rather than simply communicating workload to the cloud for consumption, the broker 310 can manage the creation of an instance of workload management software in cloud 304. This can be represented in this particular example by module 304A. The Moab branded software from Cluster Resources may is an example of the type of software an instance of which can be installed or provisioned to manage the particular workload of a requestor.

In this scenario, several benefits are realized. First, the workload management software 304A can perform necessary provisioning or modification of the reserved nodes in order to duplicate or create a particular environment which is most suitable for the workload from the requestor 312. Furthermore, having an instance of the workload management software 304A on cloud 304 can enable more efficient communication between the cloud 304 and the broker 310. Therefore, one aspect of this disclosure involves receiving a request from a requestor 312, at a brokering system 310, identifying resources within a cloud 304 for consumption, installing an instance of workload management software 304A within that selected cloud 304, providing a modification, if necessary, of the selected resources via the installed workload management software 304A, providing necessary communication of SLA and other requirements between the broker 310 and the workload management software 304A on the cloud 304, and consuming the resources associated with the request according to transmitted workload to the cloud 304. This creates a package of consumed resources that can grow and shrink according to requirements and is essentially a virtual private cloud. These resources then are configured to match middleware, operating system, particular libraries and applications or any other requirements of the workload so that these are not raw resources but dynamically created. The environment that is created in cloud 304 can be provisioned to match a private cloud such as cloud 212. In other words, if a company has a private cloud 212 and utilizing a broker 310 because they have overflow workload and need additional resources from a public cloud, this mechanism of providing an instance of workload management software can receive from the requestor 312 information associated with the environment of the private cloud, create the instance 304A of workload management software on cloud 304 and duplicate the environment such that the overflow workload will most efficiently and easily processed in the other cloud environment. This may be accomplished through virtualization through physical provisioning or any other mechanisms of modifying and managing the environment in this concept of a virtual private cloud. Principles applicable to this concept can be found in U.S. application Ser. No. 11/276,852, referenced above and incorporated herein by reference.

Figure 4:
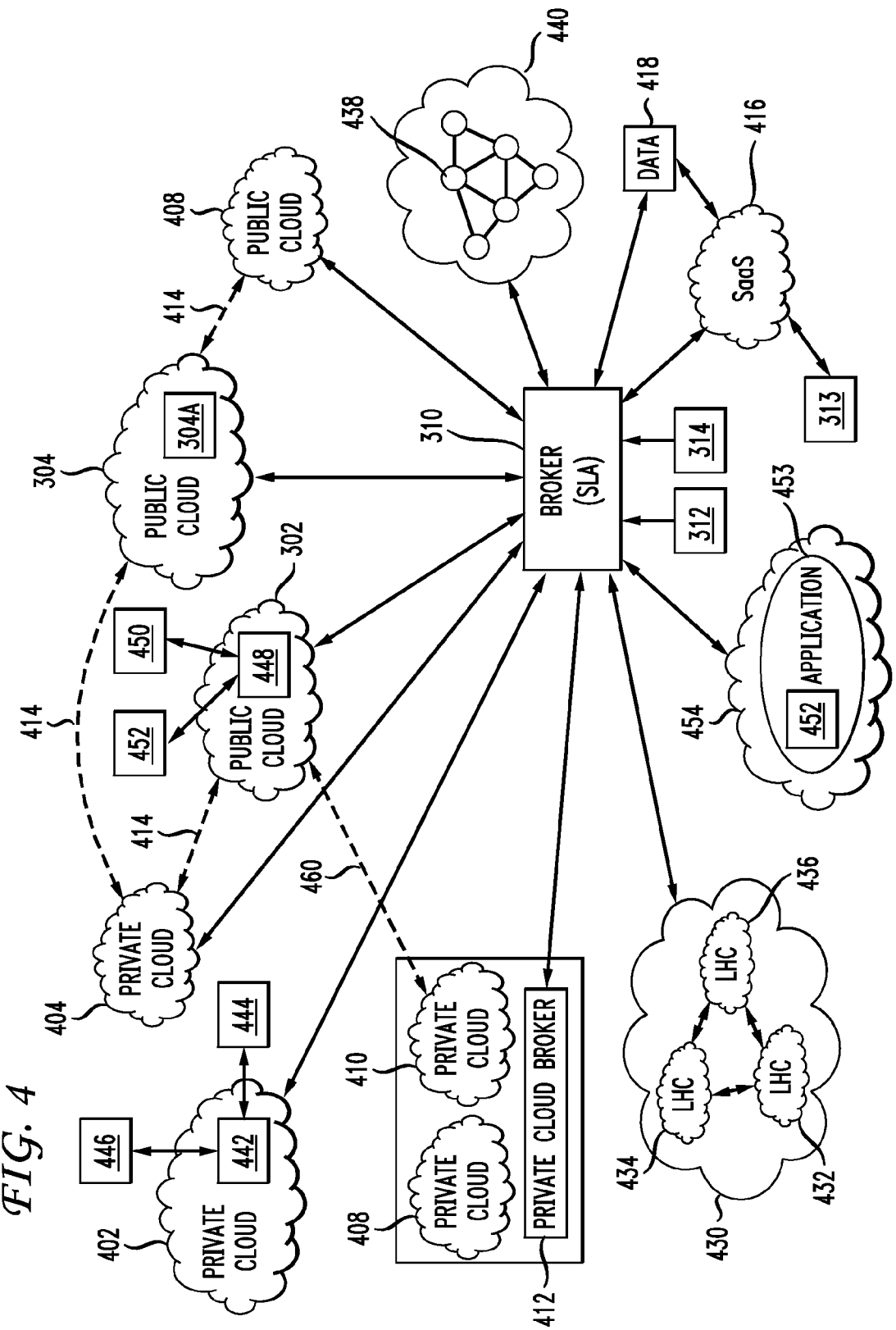
FIG. 4 illustrates another example brokering service.

FIG. 4 illustrates a system with various components that is similar in some respects to FIG. 3 with additional features. Feature 430 illustrates a local cloud network with various local hosting clouds (LHC) 432, 434, 436. These represent unifying various disparate resources typically within a company or a group of companies. This local cloud network 430 may sell its resources to other third party users. Software such as that offered by Cluster Resources can monitor, identify, and aggregate resources for the local cloud network 430 for private or public consumption. As is shown, if the resources available in the local cloud network 430 are not sufficient for handling all of its workload, it can communicate with the broker 310 as noted herein and tap into other cloud networks such that workload can be communicated as instructed by the broker to consumption resources for processing.

Application 453 represents a software application that may be used by a third party that has a need to tap into additional consumption resources. This can represent any conceivable software application run by a third party. As shown, an instance of workload management software 452 is shown as embedded within or linked to application 453. Environment 454 represents a private cloud, cluster, grid or any other compute environment that is running the application 453. An example of such workload management software is the Moab branded software from Cluster Resources. In this case, as the application 453 operates in a private cloud or a local environment 454 if the software module 452 can monitor that environment and the consumption of resources within that environment. Software 452 can intelligently determine if more resources are needed. If so, software 452 can communicate with the broker 310 and determine whether additional resources are available and at what SLA requirements and costs. For example, resources in public cloud 304 can be utilized by application 453. Then, as the use of those resources is complete, application 453 can then withdraw from the public cloud 304 and continue running only in its local environment. Using the broker 310, application 453 can obtain the best service without needing to establish and maintain a relationship with all of the available clouds. As application 453 runs in the cloud environment 304, the instance of management software 452 can be already embedded and used to customize the consumed resources in the cloud 304.

Also shown in FIG. 4 is communication between broker 310 and software as a service (SaaS) 416. As is known in the art, SaaS is a method of software deployment in which a provider 416 licenses an application to customers for use of its service on-demand. The end user does not purchase or install the software on a local computer but the software vendors host the application in their own environment 416 for use by an end user. In some cases, the software may be downloaded to a client device but disabled after the on-demand contract expires. There are many benefits to the SaaS approach in which the end user does not have the burden of purchasing a device that includes every necessary software application. Licensing requirements are also simplified as well as the need to continually update the software with corrections such as patches and upgrades and so forth. SaaS can also take advantage of the Service-Oriented Architecture (SOA) which enables software applications to communicate with each other. One aspect of the present disclosure is the ability of end users 312, 314 to access SaaS software from a vendor 416 via the broker 310, including using cloud resources.

The ability of the broker 310 to communicate with multiple clouds can also improve the ability of an SaaS service vendor 416 to avoid the cost of managing their own servers in a local environment. The broker 310 can communicate with the SaaS vendor 416 and identify and select the consumption resources within the various cloud providers for the consumption of resources utilizing the SaaS software. Therefore, this aspect of the disclosure involves receiving a request at a broker 310 for using software as a service on-demand (602), coordinating with a software on-demand vendor to provide a software application (604) identifying and selecting consuming resources from a cloud environment (606), and running the selected software application in the selected resources in the cloud environment (608). Once the SaaS software has completed its job, and the on-demand contract expires, the resources within the cloud are released for other users and any necessary data and reporting based on the SaaS software can be transmitted back to the requestor 312, 314. Licenses for the on-demand use of the software and charging for the use of cloud resources can be also managed by the broker 310 between the selected cloud and the SaaS vendor 416 and invoiced to the requestor 312 310 in an efficient manner.

Also as shown in FIG. 4, a database 418 may communicate with the broker and/or the SaaS vendor 416 as necessary. Data service 418 represents a source of data in this respect, but broker 310 can also be a data broker such as scientific data, business intelligent, temperature data, and as such may be a stream for data on demand. In this respect, FIG. 4 also illustrates a requestor 312, 314 which may require access to data 418 (independent of the SaaS vendor) which may need to utilize consumption resources within the cloud. A requestor can access the data such as might be available from a RSS feed, satellite data, or any other data source, which may need to be combined or utilized with other software services but that need consumption resources within the cloud. Accordingly, data is available to be accessed by the broker 310. As usage of a particular SaaS application increases, the broker 310 can automatically and transparently expand the resources allocated to that SaaS application within a cloud.

The above approach enables the SaaS software to be plugged in, made available and hosted or consumed on any particular resource. There may be more than one instance of the software, but the broker 310 will manage the rights, licensing, and metering to charge consumers according to SLA or other contractual relationships. An entity can provide a data mining service 418 that can provide intelligence or simply data to consumers. In this respect, if user 312, 314 through broker 310 is accessing data, it may simply be accessing a service that simply receives data such as business intelligence. The user may simply get the results of the data. This can include such things as in Google intelligence on click-through data, news sources, weather information, and so forth. Accordingly, accessing data sets such that it becomes available through the use of broker 310. In this regard, this embodiment includes receiving a request from a user 312 at a cloud broker 310 that involves a request for data and/or a need for consumption resources. Broker 310 communicates with data source 418 for providing that data and, if necessary identifies and selects consumption resources within a number of cloud environments and identifies and utilizes the consumption resources for processes that are associated with the data. Finally, the broker 310 can manage the reporting of the data or processing associated with the data to the user 312. In this way, the broker 310 can interface with the appropriate computational resources with needed specific sets of software to get the results desired by the user 312.

An example of the above approach is in human resources where applications involve a number of people simply consuming a service. These people may need to access a certain set of data, which may be internal to a company, and the value of that data may be part of what is provided back to the end user as a service. For example, companies like Gartner may access data 418 available from various data providers with regards to purchasing choices by large companies and this data may be accessible via broker 310.

In another aspect, broker 310 can provide a particular service to end user requestors 312, 314 or other environments 430, 440. For example, broker 310 can provide entities with the ability to have a continuity of compute resources. In this respect, with an appropriate SLA in place, the broker 310 can provide a local environment 430 or private cloud 402 with the ability to manage and reduce down time of their own environments. In this case, assume private cloud 402 within an entity or a company goes down because of a power outage. Broker 310 can provide the necessary business continuity in case they have such a failure and immediately find resources that can provide that continuity and shift the workload from the down cloud 402 to, for example, a public cloud 408 that has available resources. This can be for internal consumption requirements as well as providing continuity for websites. As shown in private cloud 402, web server or web servers 442 provide communication to clients 444 and 446 over the Internet (not shown). This represents end users accessing data via one or more web servers. If private cloud 402 goes down, rather than irritating customers and losing access to those web services, broker 310 can identify resources within a cloud such as cloud 302 and duplicate the necessary data for those web servers on resources 448. In this instance, public cloud also includes the necessary communicating means with the Internet such that clients 450 and 456 can continue to go to that particular uniform resource locator (URL) and access that website. In this mechanism, the continuity of the availability of the company's website is preserved through the ability of the broker 310 to immediately respond to some kind of failure and maintain that continuity. The broker 310 can act as a redirection server or can designate one or more nodes to act as redirection servers to redirect HTTP requests for the down cloud 402 to other suitable clouds. The redirection techniques can be static or dynamic and are preferably done in real time to reflect the actual status of the cloud(s) operating on the website. In one example, companies can plan for spikes in website usage by preestablishing additional resources with a cloud to handle expected increased traffic.

In yet another aspect, the broker 310 enables the ability of energy to be provided as a utility. For example, broker 310 can monitor the number of data centers that will send workload to since they have the ability to manage the energy consumption in those environments. For example, utility companies can pay a cloud in a location with high electricity demand more money to reduce their energy consumption and to get the same workload done by transferring the workload to another cloud. Public cloud 408 can be in an electrical grid that is operating on a very hot day in which there is a surge of demand for electricity. In this case, the energy company, rather than entering into a black out or a brown out, can request via broker 310, public cloud 408 to transfer workload to another public cloud in a cool environment which does not have a demand for energy consumption. Broker 310 can manage that transfer to cloud 304 and even manage the payment and negotiation of funds to enable that transfer. In this respect, utility companies can more efficiently and effectively manage the actual consumption of resources by the public clouds which are already large consumers of energy.

Broker 310 in this respect can also establish itself as an integral part of a national or international energy response service. Broker 310 can balance and manage local, national, international, or worldwide workload via its intelligent workload management algorithms.

Broker 310 in this respect can also manage carbon credits. Where various public clouds can be more energy efficient than others, broker 310 can also manage the differentials in efficient energy consumption and can manage the buying and selling of carbon credits between the various clouds with which it has a relationship. Therefore, the one aspect of the present disclosure is the broker 310 having the capability of managing carbon credits between data centers. In one example, assume public cloud 408 has an efficient energy consumption in which its energy is received from a nuclear power plant and its efficiency is such that it has carbon credits which it can sell. Assume that cloud 304 is inefficient and is in need of purchasing carbon credits because of its energy consumption approach. Broker 310 can manage the purchase of carbon credits by public cloud 304 from public cloud 408. In addition, broker 310 can utilize the knowledge gained by virtue of its green computing algorithms incorporated herein by reference above from application Ser. No. 12/179,142 and also have the ability to manage the distribution of consumption resources such that independent clouds may not reach a threshold and have to purchase carbon credits from other clouds. In this respect, assuming that individual cloud environments utilize software algorithms that allow the energy consumption management of their environment to communicate with broker 310 those energy consumption parameters and capabilities, the broker 310 can most efficiently distribute workload amongst the various clouds in order to achieve in a more globalized view, the most efficient use of energy. The broker 310 can track information on what has been consumed in various environments and identify where the cheaper environments are with regards to energy consumption. As various clouds may hit targets, and as the cost of a carbon credit may rise too high, broker 310 can, dynamically or under the instruction of a user or a public cloud, shift the consumption of resource to another type of energy or to a type of cloud. In one aspect, the various clouds may be in various countries with different climate change policies. For example, if Europe has a more advanced climate change policy than China or the United States, the SLA requirements enforced by broker 310 may include details for how the markets for carbon trading are to be managed and triggers could be in place which would cause the broker 310 to transfer workload amongst the clouds based at least in part on these factors.

Feature 440 illustrates a network with sub-administrative elements 438. This may represent a compute domain, a data domain, a cluster or grid, or an on-demand service center in which the network operates like a utility that can store or manipulate data or do computational work. This is illustrated in FIG. 4 as another aspect of this disclosure in which the broker 310 can communicate with such a network 440 and provide the ability of brokering consumption or other types of resources within the various clouds such as network resources as needed by network 440.

Figure 5:
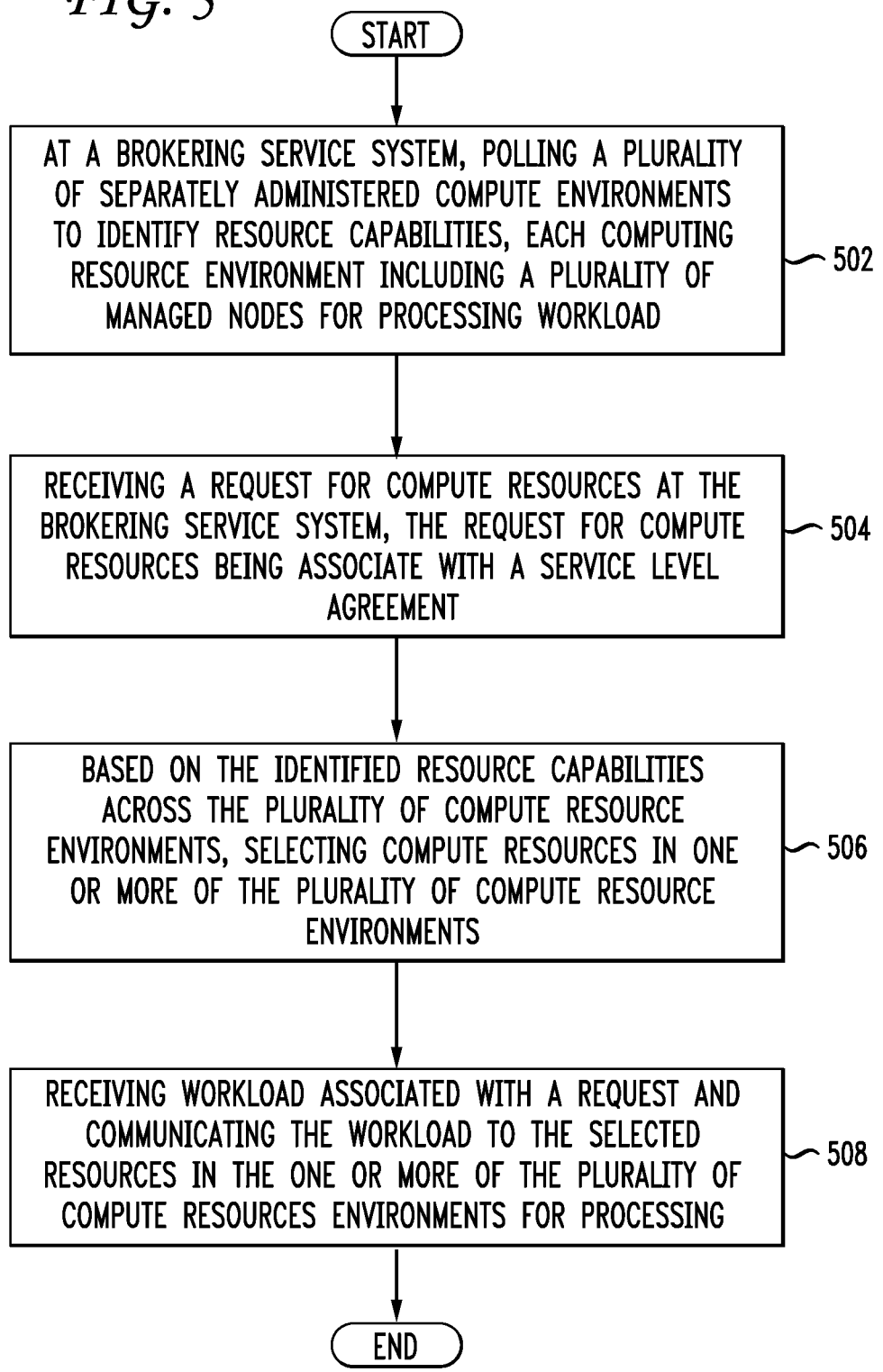
FIG. 5 illustrates a method of the present disclosure.

FIG. 5 illustrates an example of a method embodiment of the present disclosure. The method involves brokering compute resources and includes, at a brokering service system, polling a group of separately administered compute environments to identify resource capabilities, each computing resource environment including a group of managed nodes for processing workload (502) (each compute resource environment may be registered or not with the broker), receiving a request for compute resources at the brokering service system, the request for compute resources being associate with a service level agreement (504), based on the identified resource capabilities across the group of compute resource environments, selecting compute resources in one or more of the group of compute resource environments (506), and receiving workload associated with a request and communicating the workload to the selected resources in the one or more of the group of compute resources environments for processing (508). The selection of compute resources ensures that the processing complies with the service level agreement. Additional steps of the method include evaluating the processing and the workloads affinity to the selected compute resources. If necessary, the workload associated with the request for compute resources to match the workload with the selected compute resources. The polling can further identify a cost for available compute resources and each of the compute resource environments.

After communicating the workload to the selected compute environment, the method can further include analyzing parameters associated with how the selected compute environment is processing the communicated workload and, if a threshold is met, identifying and selecting new compute resources from the group of compute resource environments and migrating the communicated workload to the selected new compute resources. When the selected compute resources span more than one compute resource environment in time, the method can further include migrating the workload to compute resources within the more than one compute environment. As noted above, this can involve migrating to cheap resources, resources processing at night in cooler environments, and so forth. In the case of encryption-related export restrictions or other applicable international laws, the brokering system can further limit encryption-related workloads, for example, to domestic clouds or international clouds which are not affected by export restrictions.

In another aspect, the brokering system 310 can include learning algorithms which, in time, improve their ability to understand the needs of workload which are submitted into the various environments as well as the environments themselves. For example, if a particular type of workload is received from an accounting company, and the original selection of resources is in cloud 302 for processing the accounting workload, the brokering service 310 can predict how that workload will be processed in environment 302. However, after the environment actually processes the workload, improvements and intelligence can be gained disclosing how well and efficiently the environment process the workload as well as how well the workload needs matched with the capabilities of the environment. Over time, the brokering service 310 may actually select different resources which will more suitably match the workload. The broker 310 can record expected and actual performance of various clouds to extrapolate future performance and assign workloads based on expected performance.

Figure 6:
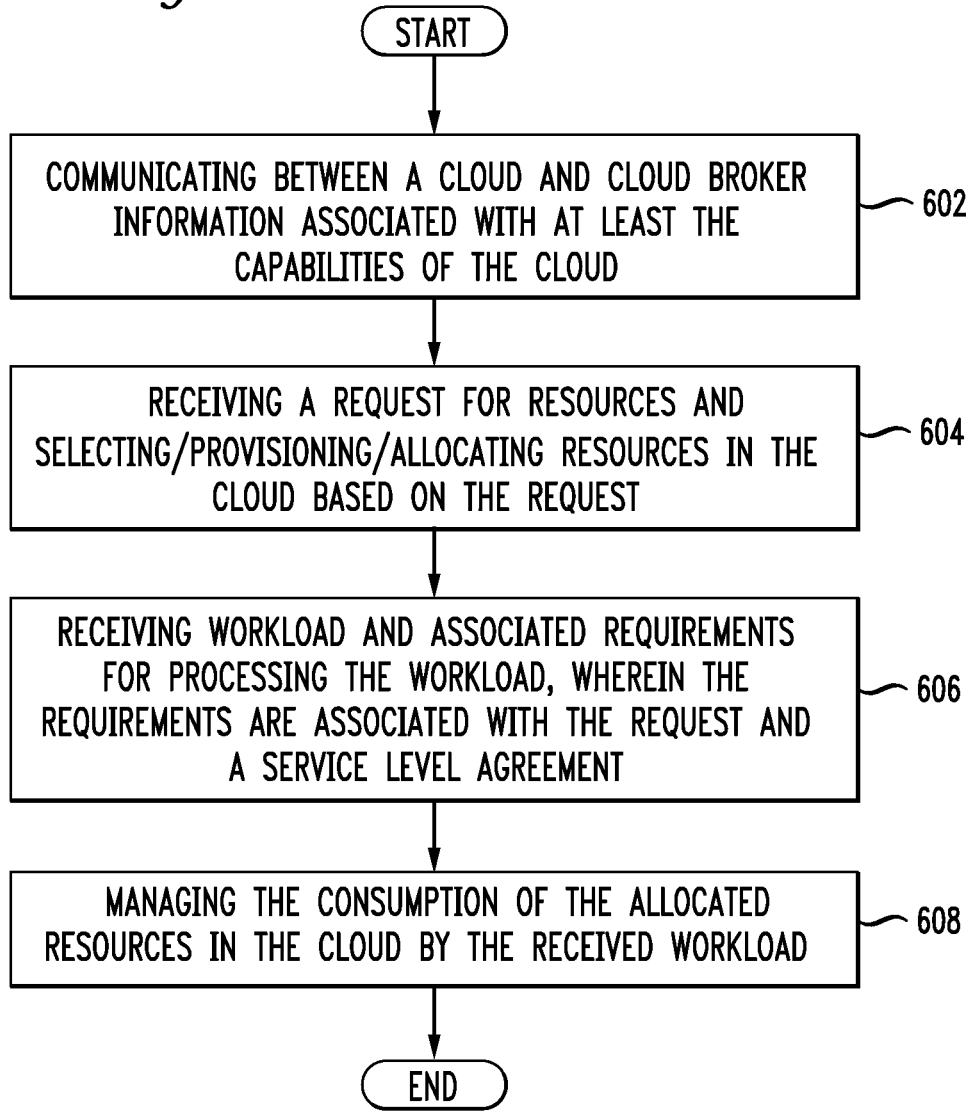
FIG. 6 illustrates another method embodiment.

FIG. 6 is a method presented within the frame of reference of how the interaction with the broker is viewed from the point of view of the public or private cloud. As shown in FIG. 6, the method includes receiving from a cloud broker 310 a polling to request information about the cloud (602). In this regard, the communicated information about the capabilities and information associated with a particular cloud may be exchanged in any number of ways. As is noted herein, the broker may periodically or on some other basis request information about the cloud. In another aspect, the cloud may periodically transmit information to the broker about its capabilities or a change in capabilities. For example, if the cloud has a large job that is scheduled to consume resources but that job gets cancelled and those resources become available, the cloud can transmit information to the broker 310 which notifies the broker 310 of the freed-up resources that have become available. Alternate pricing and other information for those resources may also be offered which can be used by the broker 310 to shift workload to those resources according to the individual SLA requirements for the various requestors. Requestors can then take advantage of a reduced pace and more immediate availability and those cycles are not wasted. The cloud then can receive a request for resources and select/provision/allocate resources based on the request (604). The cloud can include workload management software which can select, reserve, and/or provision necessary functionality or software within selected resources. In general with knowledge of the requirements from the broker, the cloud will prepare the appropriate resources for consumption by the workload. Next, the cloud receives workload and associated requirements for processing the workload, wherein the requirements are associated with the request and an SLA (606). Finally, the cloud processes the workload for the workload consumes resources in the cloud with the selected resources (608).

Other embodiments include additional views of the operation of the broker from different entities within the system. For example, the broker 322 shown in FIG. 3 illustrates and embodiment of the present disclosure in which requests are made for cloud computing services from requestors 328 and 330. The broker communicates with clouds 324, 326 within its group of resources. If a threshold is not met or the available clouds to broker 322 cannot satisfy the workload of requestors 328, 330, broker 322 then polls or transmits a request to broker 310 who can return information to broker 322 with regards to the availability of resources in its group of clouds 302, 304, 306, 308 that can meet the SLA requirements of requestors 328 or 330. Broker 322 can then communicate with broker 310 to receive workload from requestors 328, 330 and enable the communication of that workload to a cloud having a relationship with broker 310 such that the requestors workload can be consumed according to their requirements.

Another embodiment can be described in view of another entity such as private cloud 410 shown in FIG. 4. This embodiment is shown in FIG. 7. The private cloud 410 operates to receive workload from a private cloud broker 412. However, if workload in the private cloud 410 becomes too demanding or a threshold event occurs that prevents the private cloud 410 from being able to offer compute resources according to private SLA requirements, then the private cloud 410 communicates with the private cloud broker 412 (702). The private cloud broker communicates with cloud broker 310 to identify what other compute resources are available in other private clouds 402,404 or public clouds 304, 308 (704). The cloud broker 310 communicates with its various computing environments to ensure that resources are reserved/provisioned/allocated in preparation for their consumption by workload from the private cloud 410 (706). Workload then flows from private cloud 410 through communication with the private broker 412 and broker 310 to another consumption environment such as public cloud 302 (708). The communication of the workload is shown via line 460 which can be through any network or communication means which is available. In other words, the transfer of workload does not necessarily travel through private broker 412 and broker 310 to a public cloud 302 from the private cloud 420 but the brokers can manage the transition of workload from a private cloud 410 to another compute environment like public cloud 302.

The private cloud broker 412 therefore does not need to "poll" clouds 302, 304, 408 or other environments 440. The broker 310 has all of that information aggregated. Broker 412 may only be polling broker 310 and optionally other brokers (not shown). In this manner, broker 412 can easily obtain a view of other resources available to it for additional processing capabilities. All necessary SLA requirements, security, compute environment provisioning or allocating, can be managed between broker 412, broker 310 and the resulting cloud environment 302 that has the resources to be consumed (310).

Note that other various embodiments can be developed based on the disclosure set forth herein but while viewing the processing from another entity including SaaS 416, data source 418, application 453 with an embedded workload management module 452, environments 430, 440, and so forth. For example, FIG. 8 illustrates a method embodiment of an application 453 having an embedded copy of a workload management software module 452. The module 452 monitors the environment 453 on which the application is being processed (802). This can include how closely the environment 454 is able to meet SLA requirements or other internal thresholds. If a threshold is met which indicates that the current or perhaps projected capability of the environment 454 is unable to meet the appropriate standards, then the module 452 communicates with the broker 310 (804). The module 452 can include in the communication details about the preferred environment 454 and receive information back regarding the aggregated resources in the various clouds 302, 304, 408, etc. communicating with the broker 310 (806). If the appropriate resources are available at acceptable rates and capabilities (for example in cloud 408), then the broker 310 insures that the resources are reserved, provisioned, allocated, etc. such that the workflow for application 453 can be transferred in whole or in part to the cloud 408 for consuming additional resources (808). Part of the workload may continue to be processed in environment 454. For example, the data-centric portion may be shifted to the cloud 408. An instance of workload management software 452 can be optionally installed to manage the virtual private cloud (resources) created in cloud 408 for the job (810). As the job completes the resources are made available to other users, the system processes appropriate charges for the use of the resources and finalizes data reporting.

FIG. 9 illustrates an embodiment from the viewpoint of an entity offering an Saas service 416. In this embodiment, the SaaS service 416 receives a request for use of software from a user 313 (902). The user request may include SLA requirements for the use of the SaaS software which a local compute environment (not shown) for the SaaS service cannot meet. The Saas service 416 communicates with broker 310 to identify whether consumption resources are available for the SaaS service software (904). Certain SLA requirements are preferably included in the communication. If resources are available, then between the broker 310 and clouds 302, 304, 408, etc., resources are reserved, allocated, provisioned if necessary with operating systems or other requirements (906), and the SaaS software is then loaded onto the allocated resources for consumption (908). As the SaaS job completes, reporting, charging, and other housecleaning matters are finalized and the resources are made available to other users. User 313 may only be charged a single fee, some of which will be allocated to the SaaS service and some of which the SaaS service may forward to the cloud 408 (or whatever cloud had the resources), for the consumption of the resources and software, licensing etc.

Embodiments within the scope of the present disclosure may also include tangible computer-readable storage media for carrying or having computer-executable instructions or data structures stored thereon. Such computer-readable storage media can be any available media that can be accessed by a general purpose or special purpose computer, including the functional design of any special purpose processor as discussed above. By way of example, and not limitation, such computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments are part of the scope of this disclosure. For instance, while the principles disclosed herein are generally discussed in terms of a public cloud, a private cloud 412 can also receive workloads from a private cloud broker. The principles herein are applicable to all cloud compute environments. Those skilled in the art will readily recognize various modifications and changes that may be made to the principles described herein without following the example embodiments and applications illustrated and described herein, and without departing from the spirit and scope of the disclosure.

I claim:

1. A method of brokering compute resources, the method comprising:
    at a brokering service system, polling a plurality of compute resource environments to identify resource capabilities and a type of energy that powers each of the plurality of compute resource environments, each of the plurality of compute resource environments comprising a plurality of aggregated nodes;
    receiving, at a first time, a request for compute resources at the brokering service system, the request for compute resources being associated with a service level agreement;
    based on the resource capabilities across the plurality of compute resource environments and the type of energy that powers each of the plurality of compute resource environments, reserving compute resources from the plurality of compute resource environments to yield reserved compute resources for consumption at a second time, which is later than the first time;
    receiving a workload associated with the request and communicating the workload associated with the request to the reserved compute resources for processing, wherein reserving the compute resources ensures that the processing at the second time complies with the service level agreement;
    after communicating the workload associated with the request to the reserved compute resources, analyzing parameters associated with how the reserved compute resources are processing the workload associated with the request; and
    if a threshold is met, identifying and reserving new compute resources from the plurality of compute resource environments and migrating the workload to the new compute resources.

2. The method of claim 1, further comprising:
evaluating and processing, if necessary, the workload associated with the request to match the workload associated with the request with the reserved compute resources.

3. The method of claim 1, wherein the polling further identifies a cost for available compute resources in each of the plurality of compute resource environments.

4. The method of claim 1, wherein the workload associated with the request is batch workload.

5. The method of claim 1, wherein the reserved compute resources span more than one compute resource environment of the plurality of compute resource environments.

6. The method of claim 5, wherein the a first portion of the reserved compute resources comprises data centric resources in a first compute resource environment and a second portion of the reserved compute resources comprises compute intensive resources in a second compute resource environment, wherein the data centric resources are resources associated with storing data and compute intensive resources comprise processing units in the second compute resource environment.

7. The method of claim 1, wherein the reserved compute resources span more than one compute resource environment over time, and wherein the method further comprises:
migrating the workload associated with the request over time to compute resources within the more than one compute resource environment.

8. The method of claim 1, wherein the reserved compute resources comprise two similar but separated sets of compute resources, each set being in a differently administered compute resource environment, but that both alternately process the workload associated with the request.

9. The method of claim 1, wherein the reserved compute resources comprise one set of compute resources in one compute resource environment that process the workload associated with the request and a backup set of resources in a different compute resources environment that does not process the workload associated with the request unless the one set of compute resources is unable to process the workload associated with the request according to the service level agreement.

10. The method of claim 1, wherein which compute resources of the plurality of compute resource environment are available for reservation is based on an authorization associated with a submitter of the request.

11. The method of claim 1, further comprising presenting an advertisement to a requestor.

12. The method of claim 1, further comprising charging a fee to a requestor for brokering compute resources.

13. The method of claim 1, further comprising receiving a fee from the compute resource environments having selected compute resources that process the workload associated with the request based on fees charged by the compute resource environments having reserved compute resources that process the workload.

14. The method of claim 1, wherein the request is received from a requesting brokering service system that polls a second plurality of compute environments to identify resource capabilities, each compute resource environment associated with the requesting brokering service system comprising a plurality managed nodes for processing workload and each compute resource environment associated with the requesting brokering service system having registered with the requesting brokering service system.

15. The method of claim 1, wherein each of the plurality of compute resource environment is registered with the brokering service system.

16. The method of claim 1, wherein the type of energy comprises one of nuclear energy, coal-based energy and wind energy.

17. A system for brokering compute resources, the system comprising:
a processor; and
a non-transitory computer-readable storage medium operatively coupled to the processor and storing instructions which, when executed by the processor, cause the processor to perform operations comprising:
polling a plurality of compute resource environments to identify resource capabilities and a type of energy that powers each of the plurality of compute resource environments, each of the plurality of compute resource environments comprising a plurality of aggregated nodes;
receiving a request, at a first time, for compute resources at a brokering service system, the request for compute resources being associated with a service level agreement;
reserving compute resources from the plurality of compute resource environments based on the resource capabilities across the plurality of compute resource environments and the type of energy that powers each of the plurality of compute resource environments to yield reserved compute resources such that the reserved compute resources can be consumed at a second time, which is later than the first time;
receiving a workload associated with the request and communicating the workload to the reserved compute resources for processing, wherein reserving compute resources ensures that the processing at the second time complies with the service level agreement;
after communicating the workload associated with the request to the reserved compute resources, analyzing parameters associated with how the reserved compute resources are processing the workload associated with the request; and
if a threshold is met, identifying and reserving new compute resources from the plurality of compute resource environments and migrating the workload to the new compute resources.

18. The system of claim 17, the non-transitory computer-readable storage medium further comprising instructions which, when executed by the processor, cause the processor to perform further operations comprising:
evaluating and processing, if necessary, the workload associated with the request to match the workload associated with the request with the reserved compute resources.

19. The system of claim 17, wherein the type of energy comprises one of nuclear energy, coal-based energy and wind energy.

20. A non-transitory computer-readable storage medium storing a computer program having instructions which, when executed by a processor, cause the processor to perform operations comprising:
at a brokering service system, polling a plurality of separately administered compute resource environments to identify resource capabilities and a type of energy that powers each of the plurality of separately administered compute resource environments, each of the plurality of separately administered compute resource environments comprising a plurality of aggregated nodes for processing workload;

receiving, at a first time, a request for compute resources at the brokering service system, the request for compute resources being associated with a service level agreement;

based on the identified resource capabilities across the plurality of separately administered compute resource environments and the type of energy that powers each of the plurality of separately administered compute resource environments, reserving compute resources in one or more of the plurality of separately administered compute resource environments to yield reserved compute resources;

receiving a workload associated with the request and communicating the workload associated with the request to the reserved resources in the plurality of separately administered compute resource environments for processing at a second time which is later than the first time, wherein the reservation of compute resources ensures that the processing complies with the service level agreement;

after communicating the workload associated with the request to the reserved compute resources, analyzing parameters associated with how the reserved compute resources are processing the workload associated with the request; and if a threshold is met, identifying and reserving new compute resources from the plurality of separately administered compute resource environments and migrating the workload to the new compute resources.

21. The non-transitory computer-readable storage medium of claim 20, the instructions further comprising:

evaluating and processing, if necessary, the workload associated with the request to match the workload associated with the request with the reserved compute resources.

22. The non-transitory computer-readable storage medium of claim 20, wherein the type of energy comprises one of nuclear energy, coal-based energy and wind energy.

23. A system for processing workload from a brokering service, the system comprising:

a processor; and a memory operatively coupled to the processor and storing instructions which, when executed by the processor, cause the processor to perform operations comprising:

at a brokering service system, polling a plurality of compute resource environments to identify resource capabilities and a type of energy that powers each of the plurality of compute resource environments, each of the plurality of compute resource environments comprising a plurality of aggregated nodes for processing a workload;

receiving, at a first time, a request for compute resources at the brokering service system, the request for compute resources being associated with a service level agreement;

based on the resource capabilities across the plurality of compute resource environments and type of energy that powers each of the plurality of compute resource environments, reserving compute resources from the plurality of compute resource environments to yield reserved compute resources such that the workload can consume the reserved compute resources at a second time, which is later than the first time;

receiving the workload associated with the request and communicating the workload to the reserved compute resources for processing, wherein reserving the compute resources ensures that the processing at the second time complies with the service level agreement;

after communicating the workload associated with the request to the reserved compute resources, analyzing parameters associated with how the reserved compute resources are processing the workload associated with the request; and if a threshold is met, identifying and reserving new compute resources from the plurality of compute resource environments and migrating the workload to the new compute resources.

24. The system of claim 23, wherein the type of energy comprises one of nuclear energy, coal-based energy and wind energy.

* * * * *